United States Patent
Van Bemmel et al.

(10) Patent No.: US 6,201,884 B1
(45) Date of Patent: Mar. 13, 2001

(54) APPARATUS AND METHOD FOR TREND ANALYSIS IN GRAPHICAL INFORMATION INVOLVING SPATIAL DATA

(75) Inventors: Peter P. Van Bemmel, Houston; Randolph E. F. Pepper, Sugar Land, both of TX (US)

(73) Assignee: Schlumberger Technology Corporation, Houston, TX (US)

( * ) Notice: Subject to any disclaimer, the term of this patent is extended or adjusted under 35 U.S.C. 154(b) by 0 days.

(21) Appl. No.: 09/318,393

(22) Filed: May 25, 1999

Related U.S. Application Data

(60) Provisional application No. 60/120,162, filed on Feb. 16, 1999.

(51) Int. Cl.⁷ .................................. G06K 9/00
(52) U.S. Cl. ....................................... 382/109
(58) Field of Search .................. 382/100, 103, 382/106; 345/156, 965, 968, 970, 967

(56) References Cited

U.S. PATENT DOCUMENTS

| | | | |
|---|---|---|---|
| 4,713,775 | * 12/1987 | Scott et al. | 706/45 |
| 5,339,392 | * 8/1994 | Risberg et al. | 345/333 |
| 5,528,735 | * 6/1996 | Strasnick et al. | 345/427 |
| 5,537,320 | 7/1996 | Simpson et al. | 364/421 |
| 5,798,752 | * 7/1998 | Buxton et al. | 345/146 |
| 5,861,889 | * 1/1999 | Wallace et al. | 345/433 |
| 5,873,051 | * 2/1999 | Van Bemmel et al. | 702/17 |
| 5,917,486 | * 6/1999 | Rylander | 345/339 |
| 5,995,907 | * 11/1999 | Van Bemmel et al. | 702/16 |
| 6,070,125 | * 5/2000 | Murphy et al. | 702/11 |

\* cited by examiner

Primary Examiner—Andrew W. Johns
Assistant Examiner—Shervin K. Nakhjavan
(74) Attorney, Agent, or Firm—John H. Bouchard

(57) ABSTRACT

A method and apparatus are disclosed for testing a large plurality of displayed data points of recorded spatial data to determine and display trends created by different sets of the data points within the recorded spatial data. An analysis operator interactively uses an onscreen graphic tool called a widget to set trend search parameters after studying the displayed data points, and uses a pop-up menu to set other search and display parameters for the trend search. The onscreen graphic tool permits the user to easily see on-screen, and manually set, search parameters indicating the direction of a search from a user selected starting point, how far each step of a search will be performed for adjacent data points in a fault line, within what angle the search will be performed on either side of the user indicated search direction, and if trend searches being performed are in one or both directions from the user selected starting point in the recorded spatial data.

43 Claims, 21 Drawing Sheets

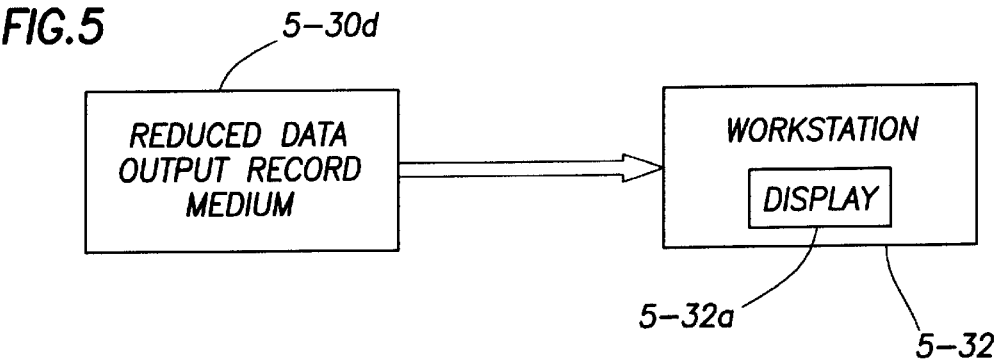
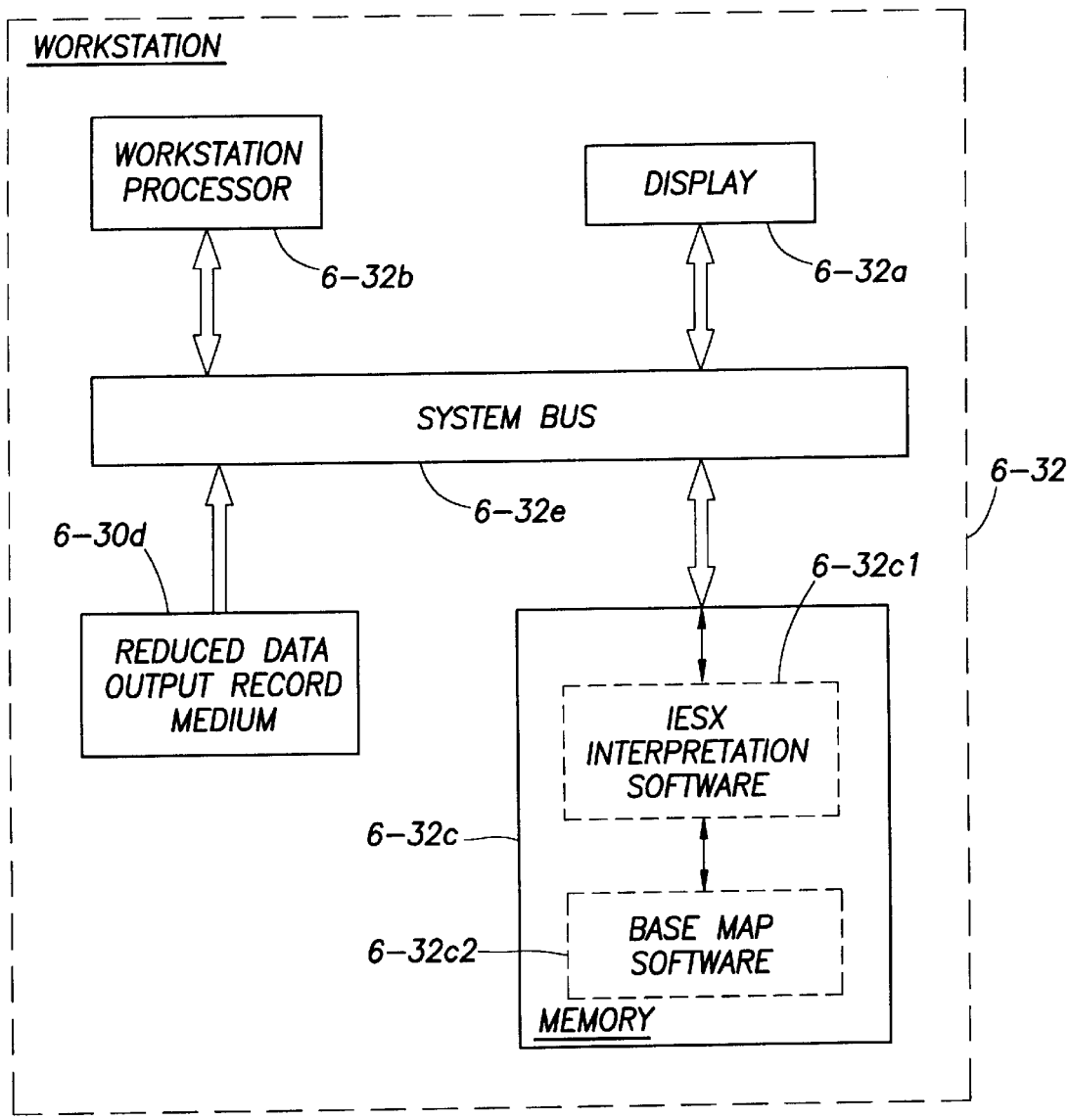

FIG.7
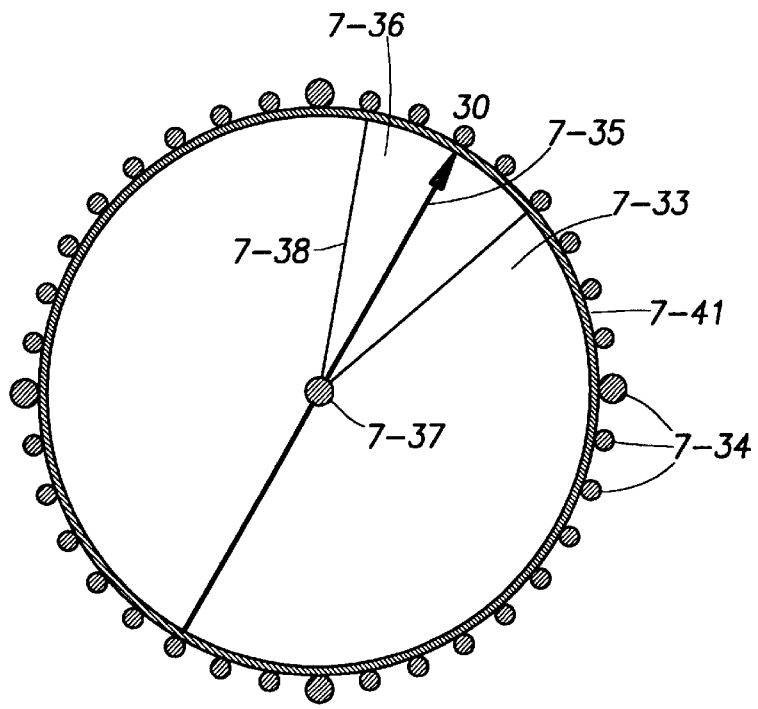
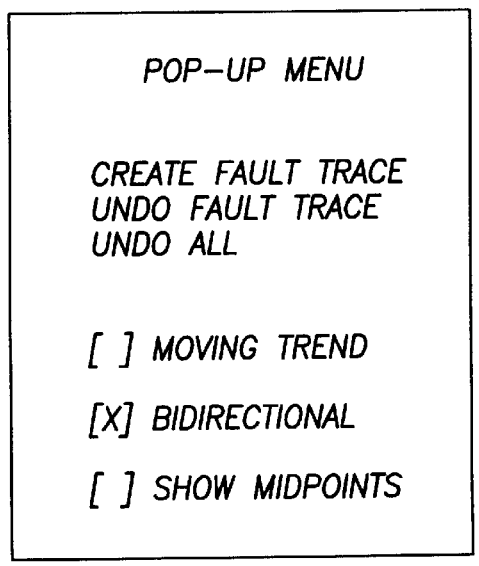
FIG.7A

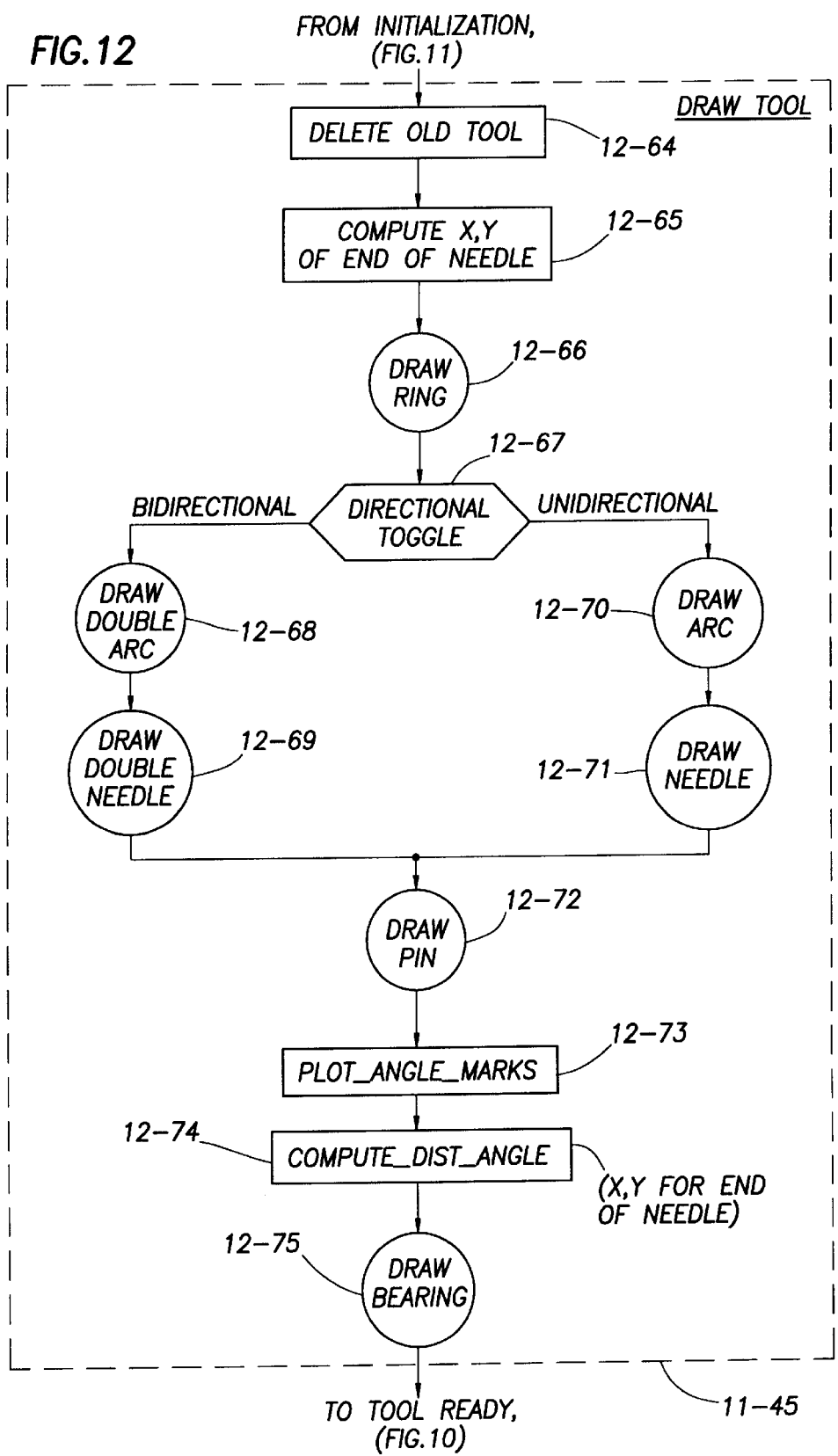

FIG.21
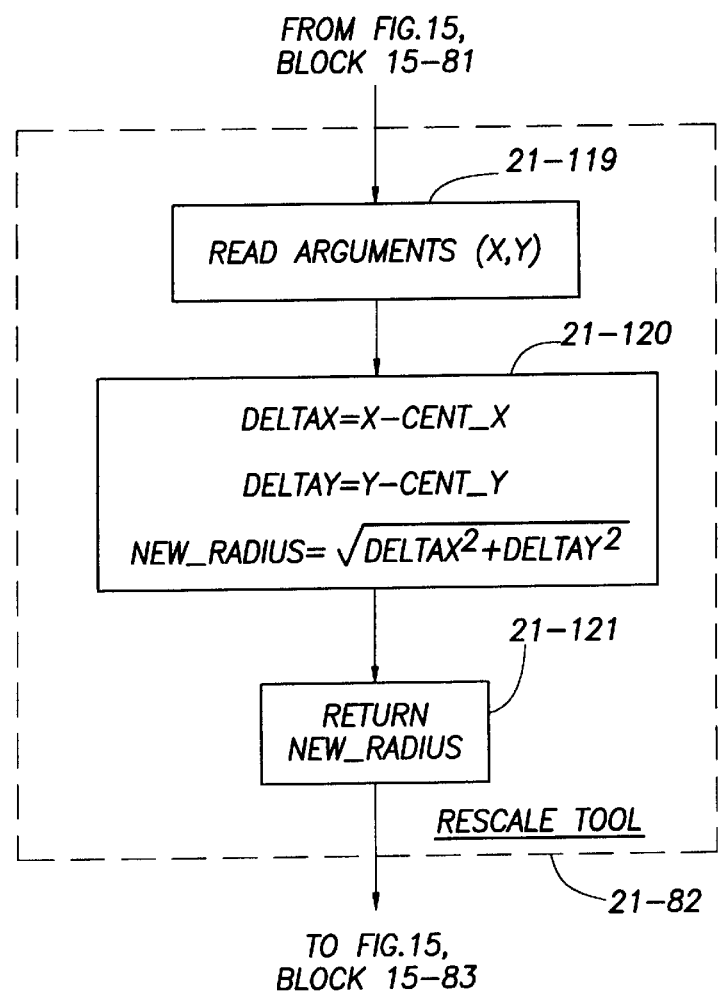
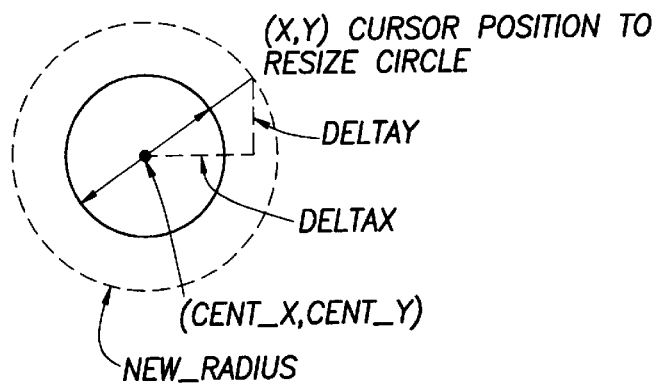

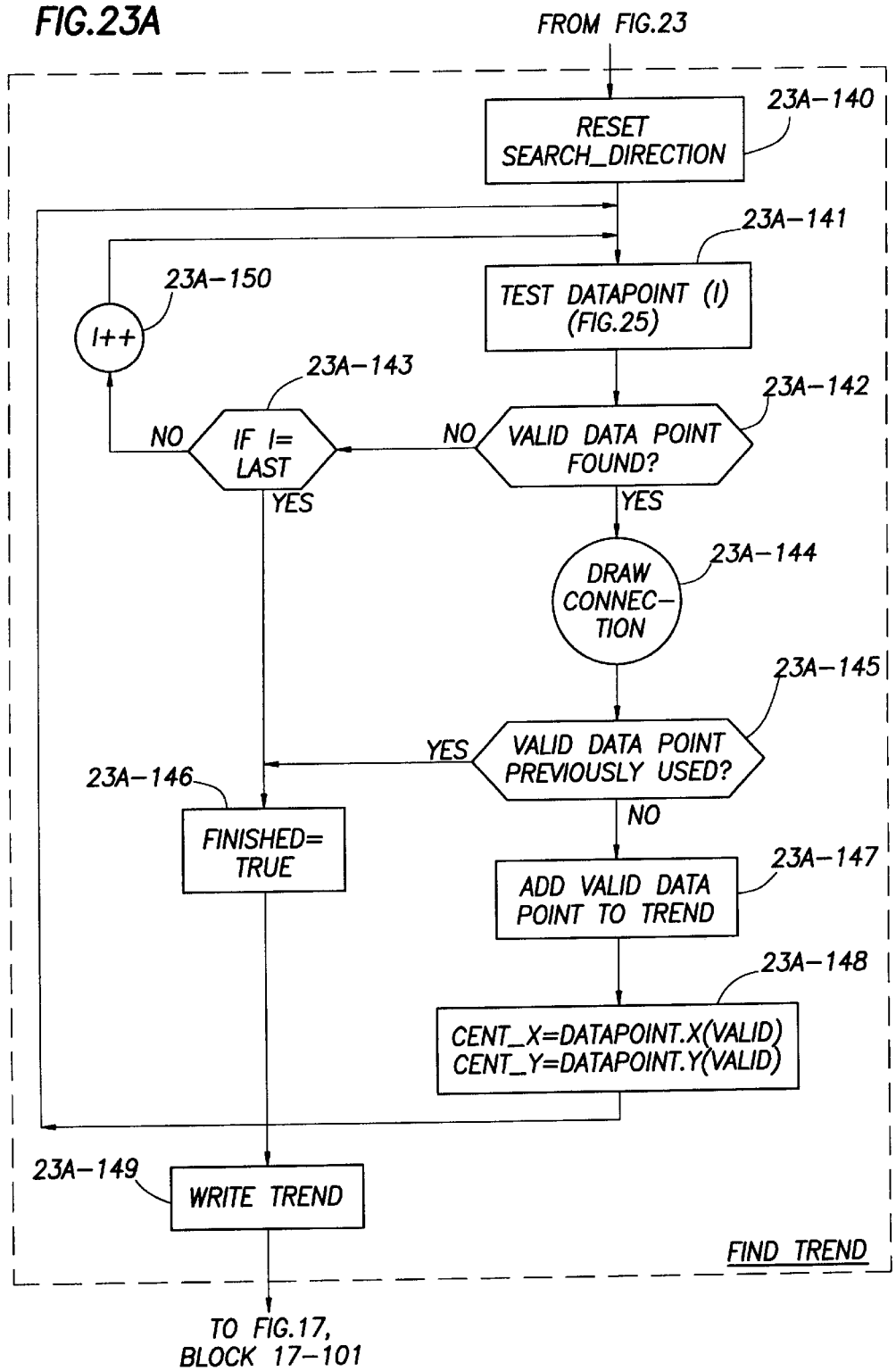

APPARATUS AND METHOD FOR TREND ANALYSIS IN GRAPHICAL INFORMATION INVOLVING SPATIAL DATA

CROSS REFERENCE TO RELATED APPLICATIONS

This is a utility application of prior pending provisional application Ser. No. 60/120,162 filed Feb. 16, 1999 entitled "Apparatus and method for trend analysis in graphical information involving spatial data"

FIELD OF THE INVENTION

This invention relates to the field of data interpretation. In particular the invention relates to an apparatus and method for determining trends in recorded spatial data. More particularly, this invention relates to an automated method of plotting individual seismic events in a three-dimensional volume of seismic data with extreme accuracy to provide petroleum exploration professionals more detailed understanding of subsurface geology and geometry.

BACKGROUND OF THE INVENTION

Faulting of stratigraphic subterranean formations creates hydrocarbon traps and flow channels. As a result, accurate identification of the fault curves and fault surfaces is essential to the interpretation of most seismic data volumes. Those persons involved in exploration to locate such hydrocarbon traps and flow channels in the formations use an interactive workstation on which is displayed sections of seismic data. The seismic data includes a plurality of fault curves or fault cuts, each fault cut representing the intersection of a fault surface with a horizontal "horizon" inherent in the seismic data. However, when using most existing workstation tools that include interactive computer programs, the interpretation of fault cuts on horizons in the seismic data is tedious and time consuming; that is, the workstation operator must view the seismic data volume on the workstation display, manually determine by viewing the seismic data where a plurality of horizons are located in the seismic data, and manually determine by viewing the plurality of horizons where a plurality of fault cuts are located in each of the plurality of horizons in the seismic data volume. For a particular vertical section, the workstation operator must carefully move a cursor over the entire length of an observed fault curve, pausing to click at points along the curve enough times so that connecting the points by straight line segments satisfactorily represents the entire curve. Then, this process must be repeated for each section on which the fault curve is desired, perhaps hundreds of sections. In map view, the intersection points of the fault curve and the horizon create a pair of points, called fault contact points. These points must be connected to render the trace of the fault. This manual method for determining the fault cuts in the horizons on the seismic data, aside from being very tedious and time consuming, produced an inconsistent set of results in terms of accuracy because the accuracy of the results depended upon the mental awareness of the workstation operator.

To automate this process various approaches have been proposed. For example, one such method and apparatus for automatically determining where a plurality of faults are located in the plurality of horizons in seismic data, is disclosed in U.S. Pat. No. 5,537,320 to Simpson et al. In the Simpson et al patent, a seed fault is placed by a user in the seismic data, and a plurality of fault curves are determined, by a computer program executing in a workstation, in response to the seed fault placed by the user in the seismic data. The Simpson patent does not teach using the technique and apparatus for automatically determining where a plurality of horizons are located in seismic data.

Therefore, there is a need in the prior art for a more accurate method and apparatus adapted to be disposed in a computer workstation for automatically identifying fault cuts and horizons in seismic data from an input seismic data volume that contains a plurality of horizons and faults, in particular, an accurate method to connect fault contact points between adjacent seismic lines, where one or more fault cuts and horizons are located in the seismic data. In addition, there is also a need for a more accurate method and apparatus for identifying fault cuts and horizons in seismic data that gives the user finer control over the parameters used by the computer workstation and program operating therein to automatically identify fault cuts and horizons.

SUMMARY OF THE INVENTION

The foregoing needs of the prior art are satisfied by the present invention. The present invention is a workstation based apparatus and associated method for automatically identifying the fault and horizon contact points in a base map view of a seismic data volume and to draw fault lines on the seismic data displayed on the workstation to be analyzed by the user of the system. In addition, the user of the novel system described and claimed herein has the improved ability to interactively interface with the workstation apparatus and program operating therein to automatically identify the fault trace associated with the intersection of a fault and horizon in the base map view of a seismic data volume.

The improved ability to interactively interface with the workstation apparatus and program operating therein is provided by giving the user of the workstation the ability to define parameters to the program which are used in automatically searching for, identifying and displaying fault cuts and horizons within a seismic data volume displayed on the workstation monitor. More particularly, using a graphical tool called a widget herein that is displayed on the workstation monitor, the user can define to the program: (a) a point in the displayed seismic data volume which is to be used in automatically searching for, identifying, and displaying a particular fault trace within the seismic data volume; (b) the direction(s) in which the search, identification, and display of a particular fault trace within the seismic data volume should be performed; (c) the distance within which the search for adjacent fault contact points in the seismic data volume; and (d) the angle about the chosen search direction in which the search, identification, and display of a particular fault trace within the seismic data volume should be performed.

It is a feature of the present invention that an on-screen graphical tool (called a widget) be provided that permits a user to interactively set search parameters used for analysis of a seismic data volume to identify fault and horizon lines, and for the user to be able to quickly and easily change those parameters on the screen of a workstation display. The parameters are used by the novel software of the present invention in searching a seismic data volume that is displayed on the screen of a workstation to identify faults and horizons in the data.

It is another feature of the present invention that the on-screen graphical tool (widget) show the trend search parameters in a simple to understand graphical manner so that the user can quickly and easily see on-screen, and manually set using a workstation mouse, what data point of the seismic data volume will be used as the starting point for a trend search to identify faults and horizons in the seismic data volume.

It is another feature of the present invention that the on-screen graphical tool show the trend search parameters in a simple to understand graphical manner so that the user can quickly and easily see on-screen, and manually set, search parameters indicating the direction of a search from a user selected starting point, how far each step of a search will be performed for adjacent data points in a fault trace, within what angle the search will be performed on either side of the user indicated search direction, and to indicate whether a trend search is to be performed in one or both directions from the user selected starting point in the seismic data volume.

DESCRIPTION OF THE DRAWING

A full understanding of the present invention will be obtained from the Detailed Description of the preferred embodiment presented hereinbelow, and the accompanying drawings, which are given by way of illustration only and are not intended to limit the present invention, and wherein:

FIG. 5 illustrates a workstation and associated display for receiving the reduced data output record medium and displaying same;

FIG. 6 illustrates in more detail the workstation of FIG. 5 used in accordance with the present invention that allows the processing system of the present invention to process, analyze, and interpret the sets of seismic data for the purpose of identifying and determining one or more fault cuts in each horizon of a plurality of horizons in the sets of 3D seismic data;

FIG. 7 shows the on-screen tool ("widget") displayed on the workstation monitor along with the reduced data output record showing seismic data, and used to set parameters for Base Map Software when detecting and displaying faults and horizons in the seismic data displayed on the monitor in accordance with the teaching of the invention;

FIG. 7A shows a Pop-Up Menu that may be called up on-screen by the analysis operator to set certain search parameters and trend display characteristics;

FIG. 12 is a flow chart of the Draw Tool program within the Base Map Software in accordance with the teaching of the preferred embodiment of the invention;

FIG. 21 is a flow chart of the Re-scale Tool program within the Base Map Software in accordance with the teaching of the preferred embodiment of the invention;

FIG. 23A is a flow chart of the Find Trend B program within the Base Map Software, used to find a trend in both directions from the center pin of the widget tool, in accordance with the teaching of the preferred embodiment of the invention;

DETAILED DESCRIPTION OF THE PREFERRED EMBODIMENT OF THE INVENTION

Figures 14, 15:
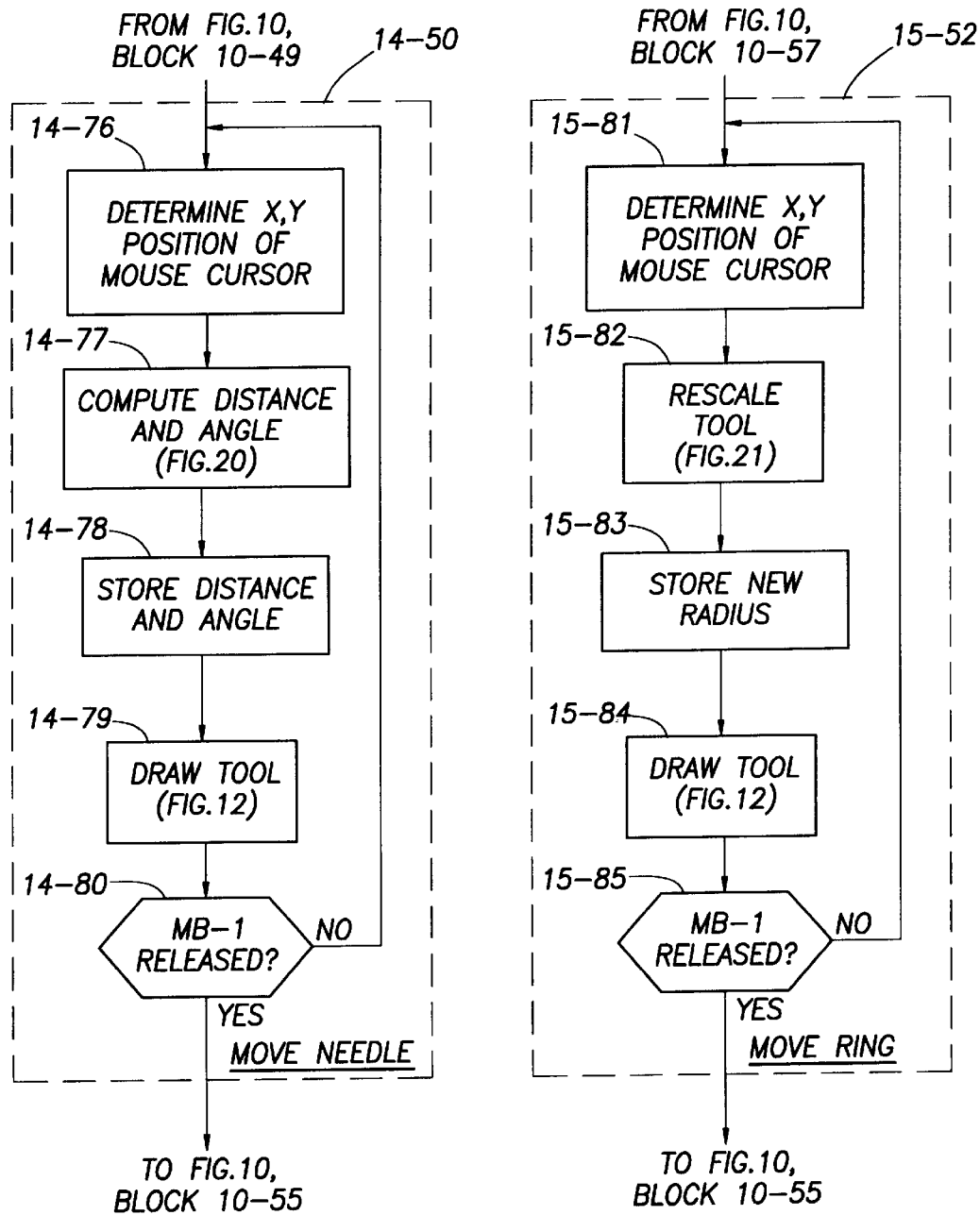
FIG. 14 is a flow chart of the Move Needle program within the Base Map Software in accordance with the teaching of the preferred embodiment of the invention.
FIG. 15 is a flow chart of the Move Ring program within the Base Map Software in accordance with the teaching of the preferred embodiment of the invention.

In the drawing and the following detailed description, all elements are assigned two or three digit reference numbers with a prefix of one or two digits. The prefix digits indicate in which Figure of the drawing an element is located. Thus, the same element appearing in different figures has the same reference number, but the prefix will change. If an element 12 is located in FIG. 7, it's reference number is 7-12; and if the same element 15 is located in both FIGS. 14 and 19 it's reference number in FIG. 14 is 14-15 and in FIG. 19 it's reference number is 19-15.

Figure 10:
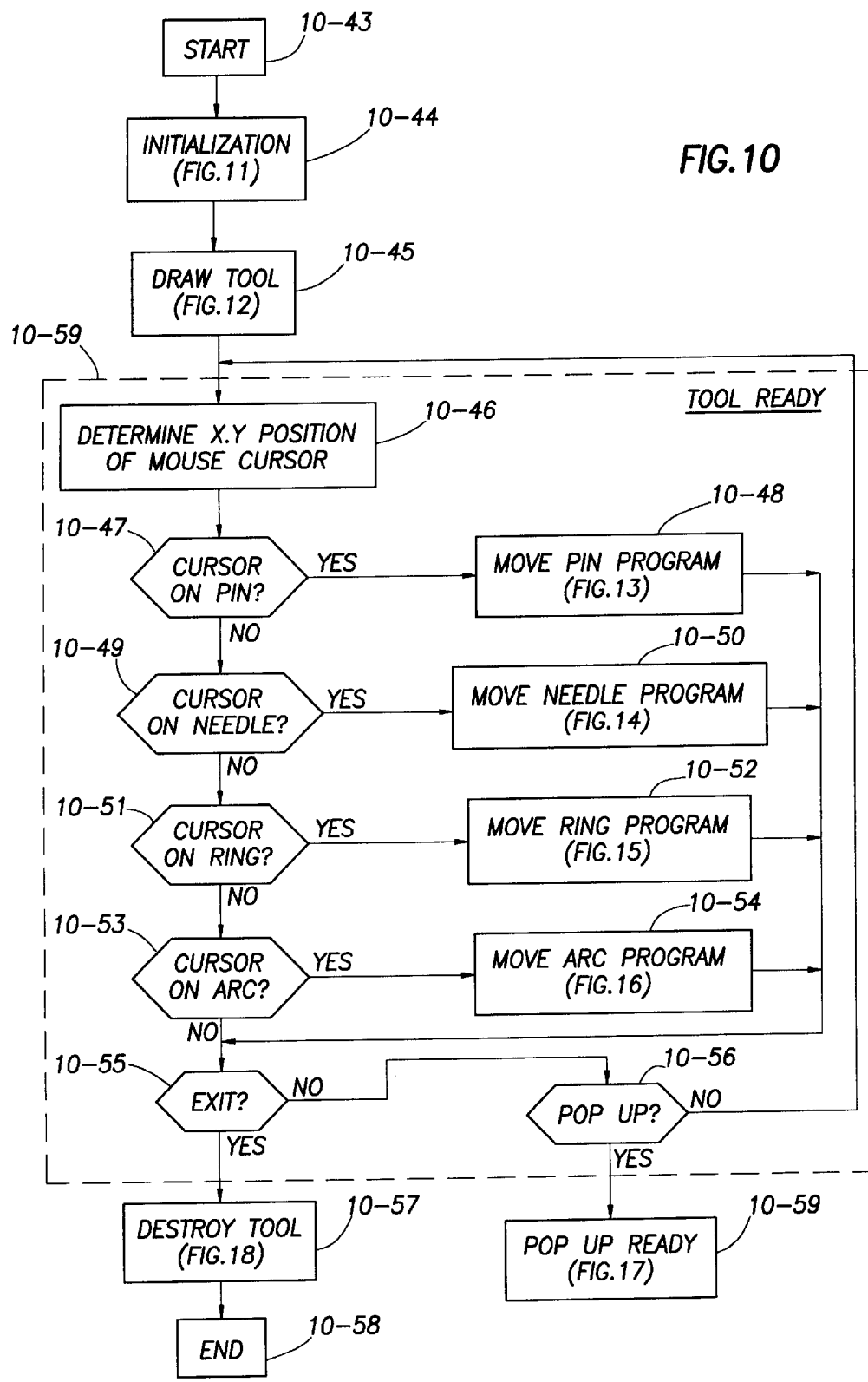
FIG. 10 is a flow chart of the Main State program within the Base Map Software in accordance with the teaching of the preferred embodiment of the invention.
Figure 13:
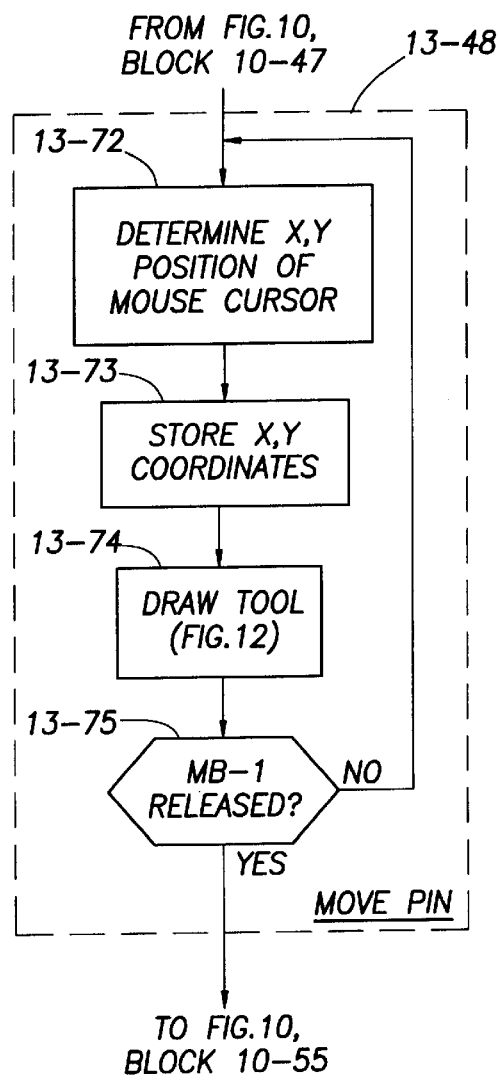
FIG. 13 is a flow chart of the Move Pin program within the Base Map Software in accordance with the teaching of the preferred embodiment of the invention.

In the program flow charts shown in FIGS. 10 through 25 a program shown in one Figure may be used in one or more other programs shown in other Figures of the drawing. Thus, for example, the Draw Tool program shown and described with reference to FIG. 12 is used in the programs shown in FIGS. 10, 13, 14, 15, 16, and 17. In FIG. 10 the Draw Tool program is assigned element number 10-45 where the number 10 reflects FIG. 10 and the number 45 is the element number for the Draw Tool Program. In FIG. 13 the Draw Tool program is designated by the element number 13-45, in FIG. 14 the Draw Tool program is designated by the element number 14-45, in FIG. 15 the Draw Tool program is designated by the element number 15-45, in FIG. 16 the Draw Tool program is designated by the element number 16-45, and in FIG. 17 the Draw Tool program is designated by the element number 17-45. An element is only described in detail with reference to the Figure in which it appears in detail, and all other times an element is used in other Figures it is not described in detail thereat, but reference is made to the detailed description. Using element Draw Tool element 45 as an example, it is described in detail with reference to FIG. 12 where it is shown and described in detail, but in the descriptions of FIGS. 13, 14, 15, 16, and 17 only reference is made to FIG. 12 for a detailed description.

Figure 1:
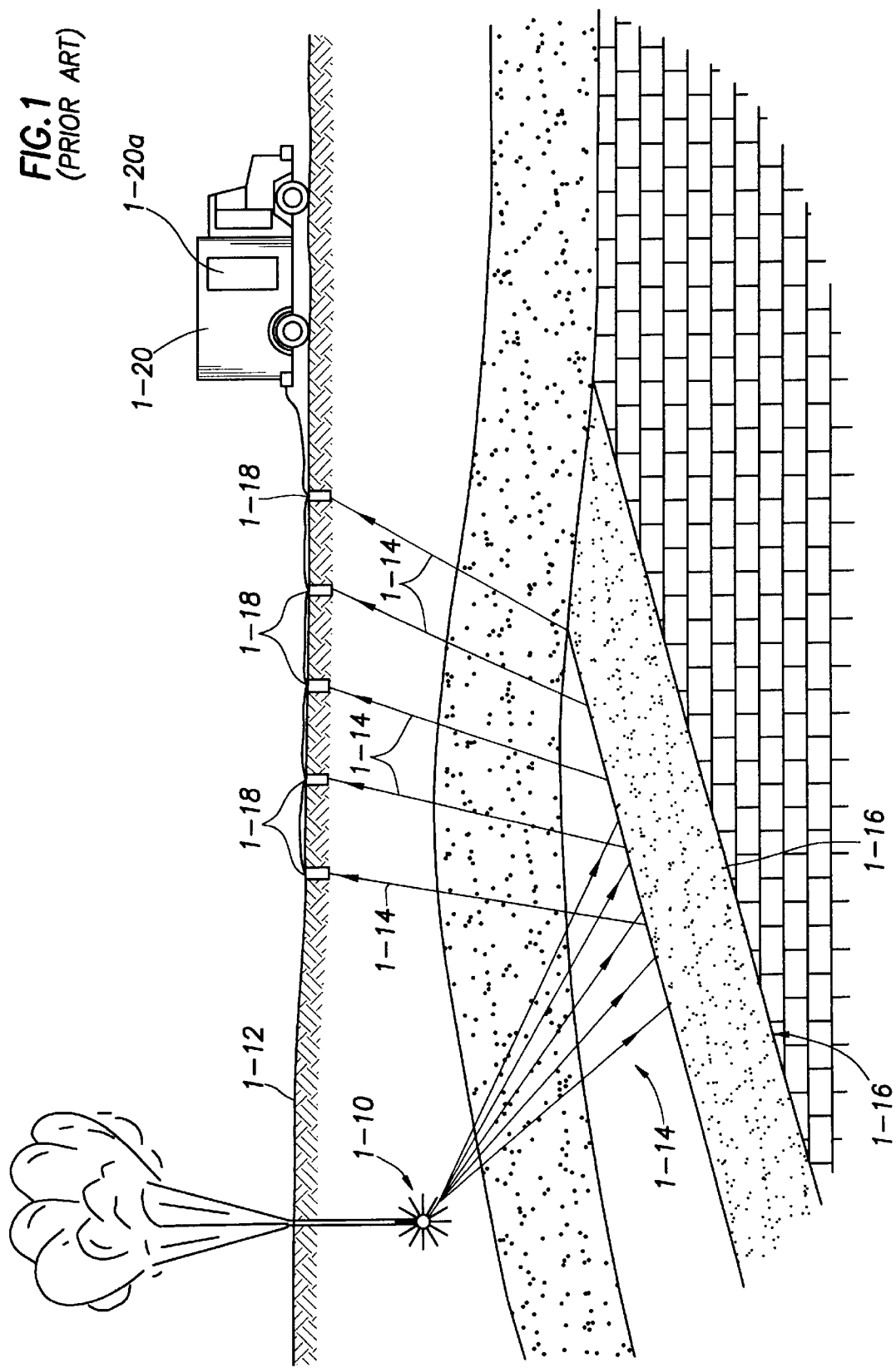
FIG. 1 illustrates a prior art method and apparatus needed for performing a 3D seismic operation.
Figure 2:
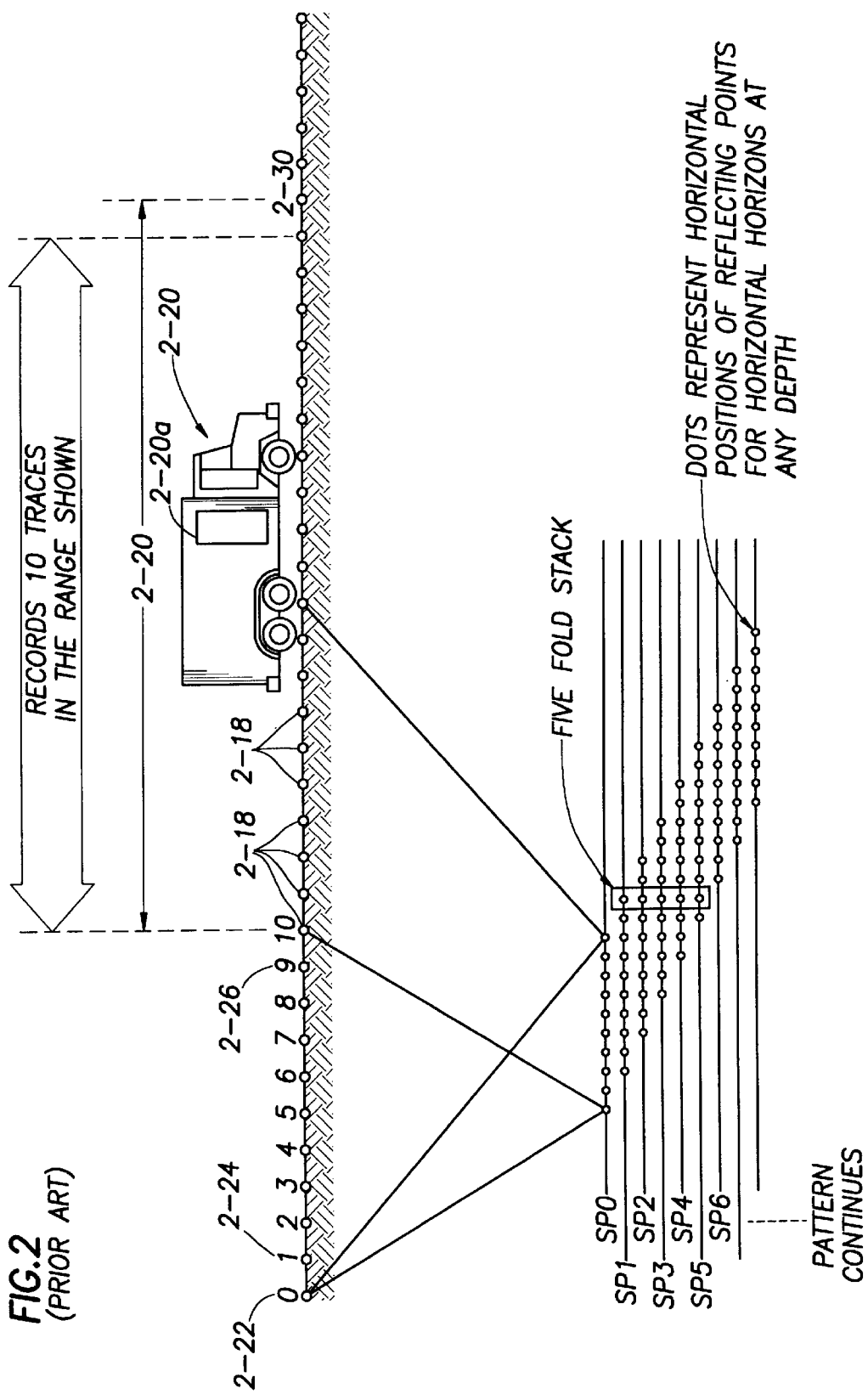
FIG. 2 illustrates another prior art method and apparatus needed for performing a 3D seismic operation.

Referring to FIGS. 1 and 2, therein are shown prior art apparatus and associated method for performing a 3D seismic operation at a location of the earth's surface.

FIG. 1 shows an explosive or acoustic energy source 1-10 situated below the surface of the earth 1-12 that is detonated and generates a plurality of sound vibrations 1-14 which propagate downwardly and reflect off a layer 1-16 within the earth. The layer 1-16 could be a rock layer or a sand or shale layer. When the sound vibrations reflect off the layer 1-16 in the earth, the sound vibrations 1-14 will propagate upwardly and will be received in a plurality of receivers 1-18 called geophones. The plurality of geophones 1-18 will each generate an electrical signal in response to the receipt of a sound vibration therein and these electrical signals are received and recorded in a recording truck 1-20. The plurality of electrical signals from the geophones 1-18 represent a set of characteristics of the earth formation located within the earth below the geophones 1-18, and, in particular, the characteristics of that portion of the earth located adjacent the layer 1-16 in the earth. The truck 1-20 contains a computer 1-20*a* that will receive and store the plurality of signals received from the geophones 1-18. An output record medium will be generated from the computer 1-20*a* in the recording truck 1-20 which will include and/or display and/or store the plurality of electrical signals that are representative of the characteristics of the earth formation situated in the earth below the geophones 1-18. The apparatus and method described above with reference to FIG. 1 is called a 2D (for two dimensional) seismic operation because the above referenced method referred to recorded sound vibrations 1-14 along the x-z axes. However, in reality, the sound vibrations 1-14 would be propagating along the x, y, and z axes. As a result, the apparatus and method described above with reference to FIG. 1 should more properly be called a "3D" seismic operation (since the sound vibrations 1-14 propagate along the x, y, and z axes in FIG. 1). The x-axis represents the horizontal distance, the y-axis represents the transverse distance, and the z-axis represents the reflection time.

FIG. 2 illustrates another method and apparatus for performing a 3D seismic operation. FIG. 2 was taken from a book entitled "Seismic Velocity Analysis and the Convolutional Model", by Enders A. Robinson, the disclosure of which is incorporated by reference into this specification.

FIG. 2 shows how the 3D seismic operation of FIG. 1 is performed 10 different times. For example, when the explosive or acoustic energy source 2-10 (not specifically shown) is located at position 2-22 (the first position or position "0" along the surface of the earth) in FIG. 2, a first plurality of electrical signals from the geophones 2-18 are stored in the computer 2-20*a* in recording truck 2-20. The explosive energy source is moved to position 2-24. When the explosive energy source 2-10 (not shown) is located in position 2-24 (the second position or position "1" along the surface of the earth), a second plurality of electrical signals from geophones 2-18 are stored in the computer 2-20*a* in recording truck 2-20. The explosive energy source 2-10 (not shown) is repeatedly and sequentially moved from positions "2" to "9" in FIG. 2 until it is located at position 2-26 (i.e.—position "9" which is the tenth position) on the surface of the earth. When the explosive energy source 2-10 is located in position 2-26 (the tenth position along the surface of the earth), a tenth plurality of electrical signals are stored in computer 2-20*a* in recording truck 220. As a result, in FIG. 2, the recording truck 2-20 records a "set of 3D seismic data" which consists of the 10 traces or ten sets of electrical signals, where each set of electrical signals comprises a plurality of electrical signals that originated from subsurface locations situated between position 2-22 and position 2-26 along the surface of the earth. An output record medium will be generated by the computer 2-20*a* in the recording truck 2-20 which includes the "set of 3D seismic data" received from the geophones 2-18. The method and apparatus described above with reference to FIGS. 1 and 2 represent a "3D seismic operation".

Figure 3:
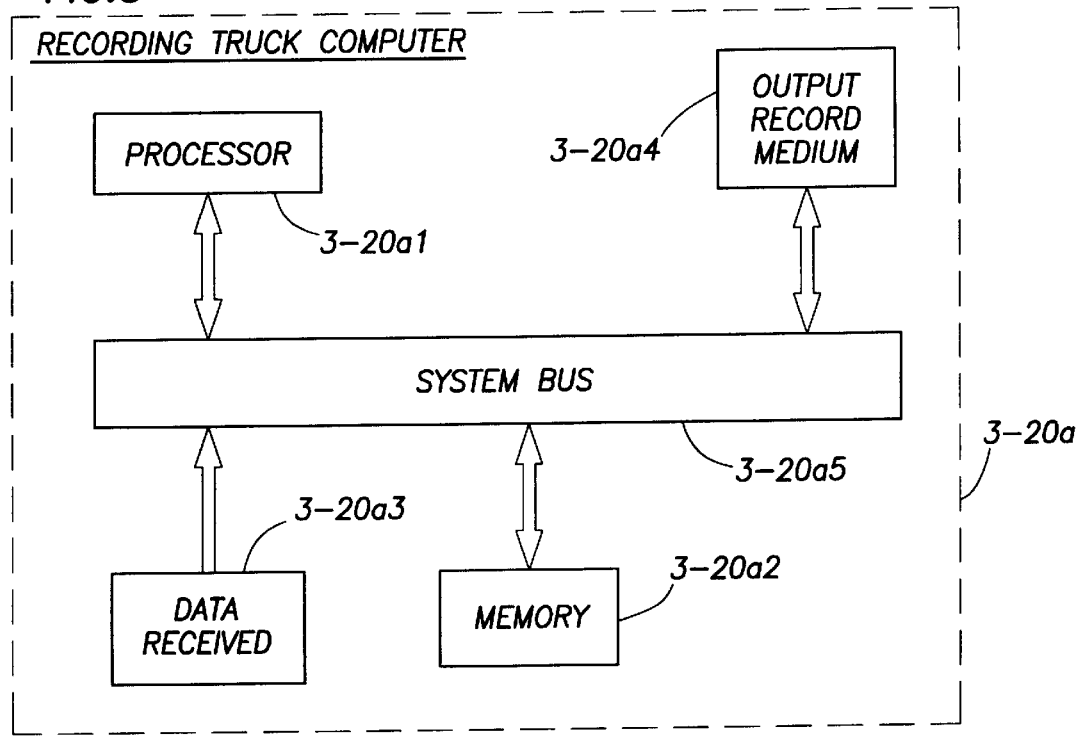
FIG. 3 illustrates a simplified diagram of the processing system present in a recording truck used during a 3D seismic operation for collecting sets of 3D seismic data obtained during the 3D seismic operation depicted in FIGS. 1 and 2 and for storing the sets of 3D seismic data on an output record medium, such as a magnetic tape.

FIG. 3 shows a more detailed construction of the recording truck computer 3-20*a*. The recording truck computer 3-20*a* includes a processor 3-20*a*1 and a memory 3-20*a*2 connected to a system bus 3-20*a*5. The set of 3D seismic data (the ten traces or ten sets of electrical signals, received from the geophones 1-18, 2-18 of FIGS. 1 and 2 and generated by the geophones 1-18, 2-18 during the 3D seismic operation) are received into the recording truck computer 3-20*a* via the "Data Received" block 3-20*a*3 connected to the system bus 3-20*a*5, and then stored in memory 3-20*a*2. When desired, an output record medium 3-20*a*4, also connected to the system bus 3-20*a*5, is generated which will include, store, and/or display the set of 3D seismic data; and, more particularly, the ten traces or ten sets of electrical signals received from the geophones 1-18, 2-18.

Figure 4:
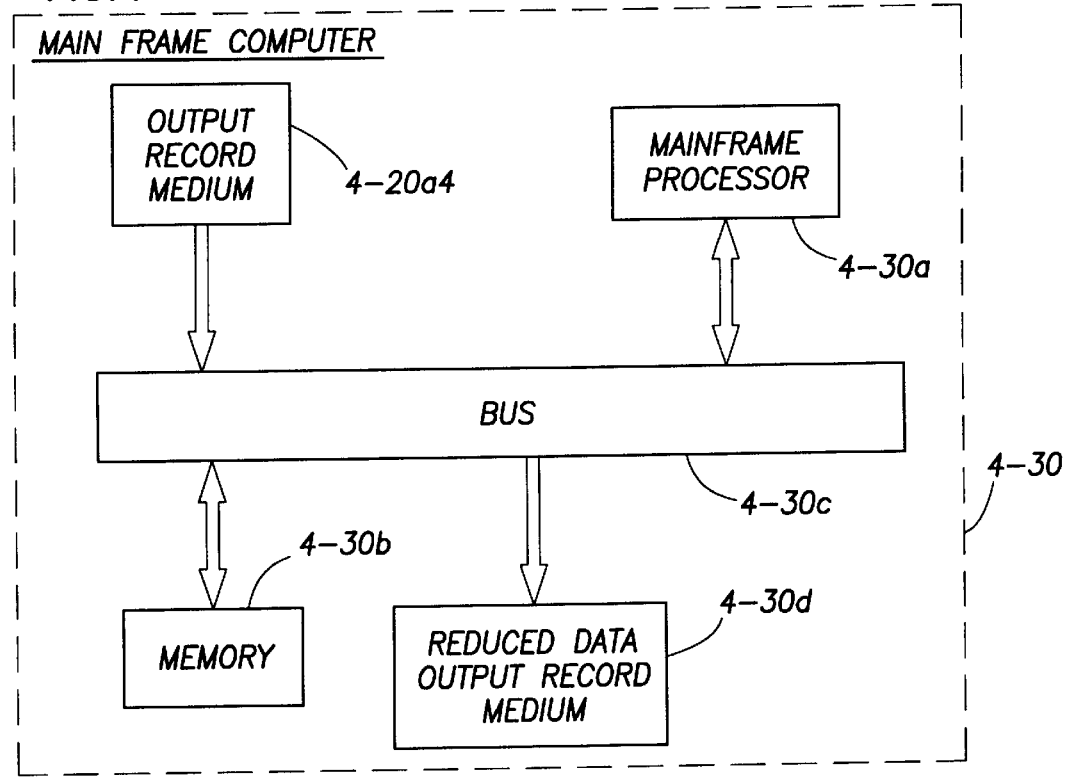
FIG. 4 illustrates a simplified diagram of a mainframe computer which uses a stored data reduction software to perform data reduction on the sets of 3D seismic data stored on the output record medium of FIG. 3 and producing a reduced data output record medium.

FIG. 4 shows a simplified diagram of a mainframe computer is illustrated which uses a stored software to perform a "data reduction" operation on the set of 3D seismic data (the 10 traces) stored in the output record medium 3-20*a*4 of FIG. 3. The mainframe computer 4-30 produces a reduced data output record medium which displays and/or stores reduced versions of the set of 3D seismic data.

FIG. 4 shows a mainframe computer 4-30 that includes a mainframe processor 4-30*a* connected to a system bus 4-30*c* and, also connected to the system bus 4-30*c*, a memory 4-30*b* which stores data reduction software therein. The data reduction software may advantageously be the "Seismos" software sold by Geco-Prakla, a subsidiary of Schlumberger. The output record medium 420*a*4 (also shown in FIG. 3 as 3-20*a*4) is connected to the system bus 4-30*c*, and the set of 3D seismic data from the output record medium 4-20*a*4 is made available to the mainframe processor 4-30a and the data reduction software stored in memory 4-30b. The mainframe processor 4-30a executes the data reduction software and, as a result of the execution thereof, mainframe processor 4-30a will: (1) perform a data reduction operation on the set of 3D seismic data stored on the output record medium 4-20a4, and (2) generate a "reduced data output record medium" 4-30d associated with the set of 3D seismic data stored on the output record medium 4-20a4. Therefore, in FIG. 4, when the data reduction software in memory 4-30b is executed by the mainframe processor 4-30a in association with the set of 3D seismic data, a reduced data output record 4-30d is generated of the set of 3D seismic data. The reduced data version of the set of 3D seismic data, stored on the reduced data output record medium 4-30d, represents spatially corrected subsurface images of the earth formation shown in FIG. 1.

FIG. 5 very generally depicts an interpretation workstation 5-32, which stores a software package (IESX) that processes the reduced data output record medium, and includes a display 5-32a that will ultimately visually display a plurality of "fault contact points" as described with reference to FIG. 8. The workstation 5-32 is electrically connected to and it receives the reduced data output record medium 5-30d (such as a magnetic tape) which was generated by the mainframe computer 4-30 of FIG. 4. As a result, the data-reduced version of the set of 3D seismic data, stored on the reduced data output record medium 5-30d, is loaded into the workstation 5-32 of FIG. 5 for processing.

FIG. 6 shows the interpretation workstation 5-32 of FIG. 5 in greater detail as workstation 6-32. In FIG. 6, the workstation 6-32 includes the display 6-32a and a workstation processor 6-32b connected electrically to the system bus 6-32e, and a memory 6-32c also connected electrically to the system bus 6-32e. The reduced data output record medium 6-30d, generated from FIG. 4, is applied to the bus 6-32e. As a result, the set of 3D seismic data stored on the reduced data output record medium 6-30d is made available to the workstation processor 6-32b and its associated software stored in workstation memory 6-32c. The workstation memory 6-32c stores two types of software. The first software stored in memory 6-32c1 (IESX Interpretation Software) is used by an analyst on the reduced data output record medium 6-30d to generate and display the "fault contact points" which are illustrated as small circles in FIGS. 8 and 9, and the second software stored in memory 6-32c2 (Base Map Software) processes the "fault contact points" and displays fault lines in accordance with the teaching of the present invention, as shown in FIG. 9.

When the workstation processor 6-32b executes the Base Map Software stored in memory 6-32c2, in association with the IESX Interpretation Software stored in memory 6-32c1, the data-reduced version of the set of 3D seismic data stored in the reduced data output record medium 6-30d is fully analyzed for the purpose of determining and identifying one or more fault cuts in each valid gap in each horizon in the 3D seismic data. When the data-reduced version of the set of 3D seismic data is fully analyzed, a particular output known as "fault lines" (shown in FIG. 9) is produced, in accordance with the teaching of the present invention, from which a geoscientist can determine the characteristics of the formation layer 1-16 of FIG. 1. When such characteristics are known, the possible existence of underground deposits of hydrocarbons in the formation layer 1-16 may be determined. The workstation 6-32 can comprise a Silicon Graphics Indigo2 workstation. The operating system software for workstation 6-32 is IRIX 5.3.

The IESX Interpretation Software 6-32c1, which is stored in memory 6-32c of the workstation 6-32 of FIG. 6, can be obtained from Geoquest Inc., a division of Schlumberger Technology Corporation, Houston, Tex. The IESX Interpretation software 32c1 program is written in C programming language under Unix and Motif standards, and the program can be re-complied and run on Sun workstations in conjunction with other IESX products listed below. In addition to the Unix workstation operating environment, the minimum IESX Interpretation Software 32c1 is as follows: (1) IESX runtime license, part no. UAMR1-QD1, (2) IESX data manager, part no. UAMD1-QD1, and (3) IESX Seis3DV, Part No. UA3DI-QD1. The IESX Interpretation software 32c1 of FIG. 6 can be obtained by contacting Geoquest, a division of Schlumberger Technology Corporation, Houston, Tex.

Figure 9:
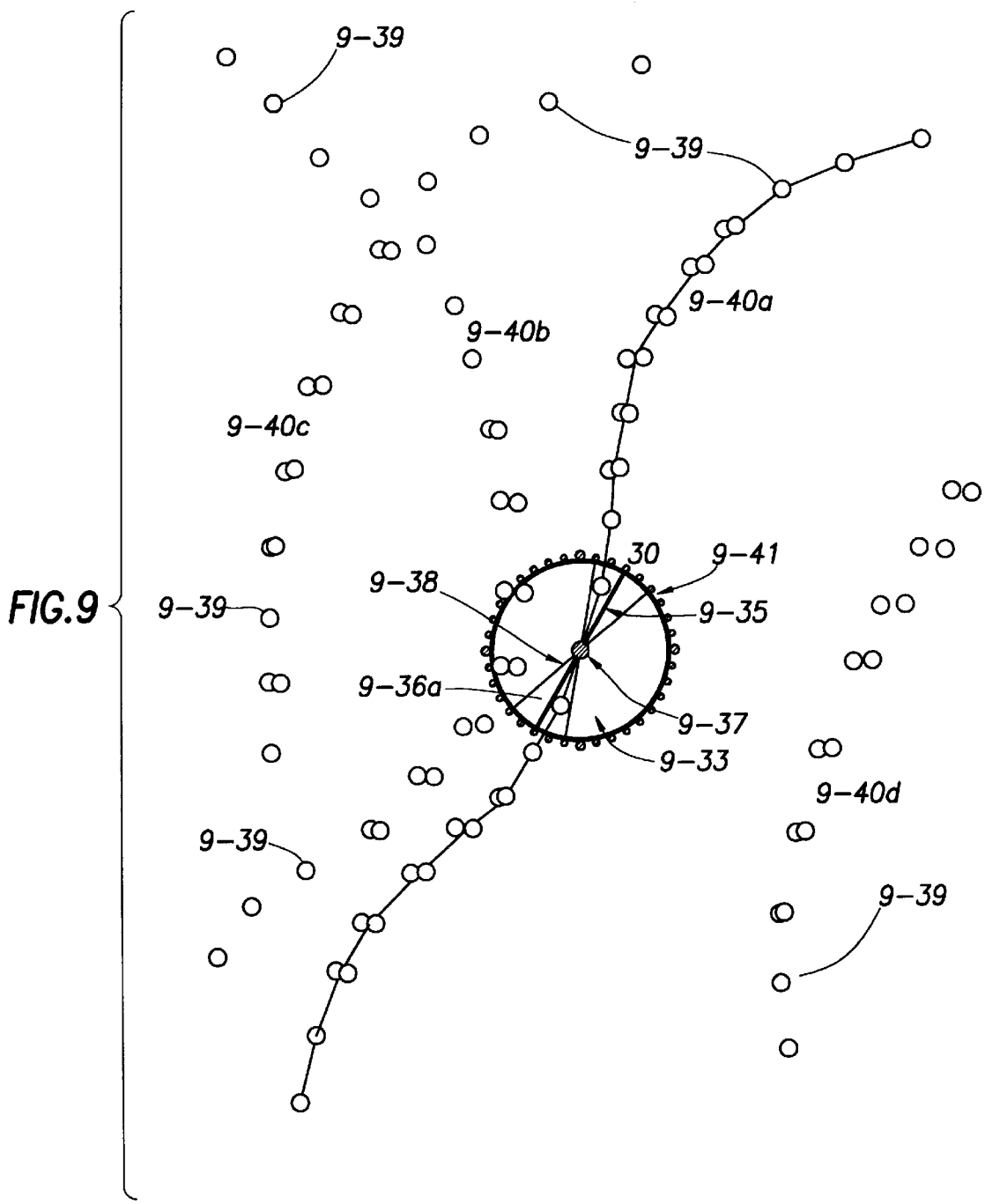
FIG. 9 shows the display of a fault line in seismic data displayed on a workstation monitor as detected by the software of the present invention using parameters specified by the user with the widget tool.

The Base Map Software 6-32c2 of the present invention can be obtained by contacting Geoquest, a division of Schlumberger Technology Corporation, Houston, Tex.; and it operates in conjunction with Geoquest's IESX Interpretation Software 6-32c1 to identify fault and/or horizon lines as shown in FIG. 9.

Workstation 6-32 utilizes a three button mouse. In the description of FIGS. 7, 8 and 9 which follows, the left mouse button is designated MB-1, the middle mouse button is designated MB-2, and the right mouse button is designated MB-3. However, it will be recognized by those skilled in the art that the designation of particular mouse buttons may be easily changed. For example, for use by a left-handed person, the right mouse button may be changed to MB-1 and the left mouse button MB-3.

Figure 8:
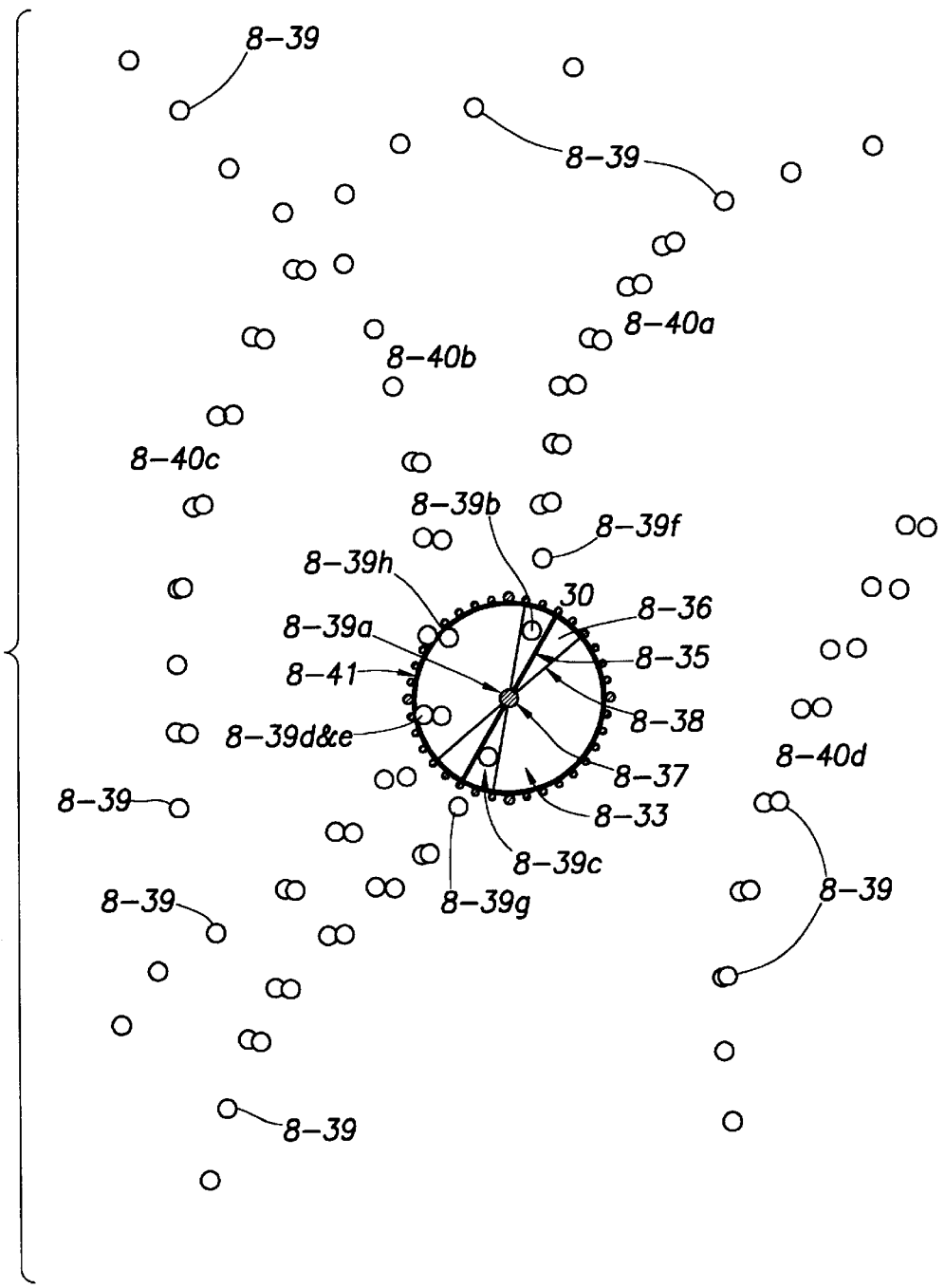
FIG. 8 shows the display of seismic data on a workstation monitor along with the display of the on-screen tool/widget used in implementing the preferred embodiment of the invention.

FIG. 7 shows a graphic tool (called a "widget" herein) 7-33 that is displayed on the workstation display 6-32a by the novel Base Map Software along with the display of the fault contact points, which are the small "circles" shown in FIGS. 8 and 9, and are displayed by the IESX Interpretation Software. The widget is interactively used by the analysis operator of workstation 6-32 to direct the search operations of the Base Map Software to aid in identifying faults and horizons in a seismic data volume, displayed as fault contact points by the IESX software, and to draw fault lines and horizon lines on the seismic data displayed on the workstation display 6-32a to be analyzed by the operator.

The "widget" 7-33 consists of a circle 7-41 having angle position marks 7-34 positioned around its periphery every ten degrees. At the center of widget 7-33 is a dot 7-37 called the "pin" which is used to designate a fault contact point as the point from which to start the search function that results in the display of a fault or horizon line, as shown in FIG. 9, as a series of fault contact points inter-connected by lines.

After widget 7-33 is initially displayed responsive to the operator operating mouse button MB-1, as described in more detail further in this Detailed Description with reference to FIG. 8 and other Figures in the drawing, the analysis operator places the mouse cursor on specific portions of widget 7-33, operates mouse button MB-1 and drags the mouse cursor to change a number of manually selected variables of the widget to specify parameters for a fault and horizon search through the displayed fault contact points. These variables are the search distance (radius of widget 7-33), the direction of the search as indicated by needle 7-35, (either a unilateral search or a bi-directional search in both directions of needle 7-35), and the angle of search 7-36 about needle 7-35 which is the angle alpha of the pie section 7-36 about needle 7-35. This operation is described in greater detail further in this Detailed Description. Briefly, if the mouse cursor is placed on widget circle 7-41, the mouse button operated and the mouse cursor moved, the search radius will be changed as reflected by the new radius of circle 7-41. Similarly, if the mouse cursor is placed on needle 7-35, the mouse button operated and mouse cursor moved in either direction away from needle 7-35, the direction of search represented by needle 7-35 will be changed as indicated by the new direction that needle 7-35 points when the mouse button is released. The pie shaped segment 7-38 will follow needle 7-35. Also, if the mouse cursor is placed on any one of the sides 7-38 of the search angle, the mouse button operated and mouse cursor moved in either direction away from side 7-38, the search angle alpha will be changed.

FIG. 7A shows a Pop-Up Menu that may be called up on-screen by the analysis operator to set certain search parameters and perform certain search operations. To call up the Pop-Up Menu the analysis operator operates and holds operated mouse button MB-3. The operator selects search functions and parameters by placing the mouse cursor on items in the Pop-Up Menu and releasing mouse button MB-3 to select functions and change parameters. As shown in FIG. 7A Bi-directional is selected as represented by the "X" adjacent thereto and a bi-directional search will be performed when the operator subsequently selects Create Fault Trace.

When the operator places the mouse cursor on "Create fault trace" and releases mouse button MB-3 the Base Map Software will generate a fault trace using the current widget search settings. With reference to FIGS. 8 and 9, the operator will have set the search parameters as reflected by the settings of widget 8-33 as shown in FIG. 8 and in the Pop-Up Menu. Upon the operator selecting "Create fault trace" by releasing mouse button MB-3 the program will generate the bi-directional fault line shown the FIG. 9.

If the operator places the mouse cursor on "Undo fault trace" and releases mouse button MB-3 the program will remove the latest fault trace generated. That is, the fault trace as shown in FIG. 9 will be removed and the screen of the workstation display 6-32*a* will again appear as shown in FIG. 8.

Should the operator select "Undo all" by placing the mouse cursor thereon and releasing mouse button MB-3 the program will remove all fault traces previously generated and displayed on workstation display 6-32*a*.

The last three operator selected items on the Pop-Up Menu are "Moving Trend", "Bi-directional", and "Show Midpoints". When the operator selects Moving Trend by placing the mouse cursor thereon and releasing mouse button MB-3, the program changes the search direction based on previously identified fault contact points. That is, in FIG. 7 the unidirectional search will be performed in the directional of thirty degrees, but if Moving Trend is selected, the search directional will be switched to two-hundred ten degrees. The needle head on the end of needle 8-35 will switch to the opposite end of the needle and point to two-hundred ten degrees. At the same time the display of 30 degrees on the periphery of widget circle 8-41 will disappear and the display of 210 degrees will appear (not shown in FIG. 7). When the operator selects Bi-directional by placing the mouse cursor thereon and releasing mouse button MB-3, the program will search in both directions of needle 8-35 when the operator selects Create fault trace. In addition, when the operator has selected Bi-directional, needle 8-35 has an needle head displayed on both ends of the needle as shown in FIGS. 8 & 9, but not in FIG. 7. When Bi-directional is not selected the bi-directional fault line displayed in FIG. 9 will not be shown. When the operator selects Show Midpoints by placing the mouse cursor thereon and releasing mouse button MB-3 the program will display midpoints along the displayed fault line. The midpoint refers to the location where the fault line will pass through a pair of fault contact points associated with the same fault-horizon intersection.

FIG. 8 shows a number of fault contact points 8-39 displayed on display 6-32*a* of workstation 6-32 by the IESX software. They are displayed as a number of small circles and represent points along horizons and/or faults in the seismic data set. Only a small number of fault contact points 8-39 are displayed in FIG. 8 for ease in understanding the invention, but in actuality there would be many hundreds or thousands of fault contact points displayed. Of the fault contact points 8-39 shown in FIG. 8, only a small, representative number of these points are designated with a lead line and element number 8-39 to avoid cluttering the drawing. Element numbers 8-40*a,b,c,d* are each placed adjacent to a set of fault contact points in FIG. 8 to represent a horizon or fault line reflected by a number of adjacent fault contact points 8-39.

When the analysis operator utilizing workstation 6-32 wishes to enable the Base Map Software and call up widget 8-33 on workstation display 6-32*a*, on which is already displayed a large multiplicity of fault contact points 8-39, the operator presses mouse button MB-1, or selects the Software from a menu. Responsive thereto, widget 8-33 is displayed on workstation display 6-32*a* as shown in FIG. 8. Widget 8-33 will be displayed on display 6-32*a* in the same physical position that it was displayed the previous time that the Base Map Software was utilized and then terminated.

In operation the analysis operator will study the displayed default contact points 8-39 and will choose a point, such as fault contact point 8-39*a* on a fault line 8-40*a*, to use as a starting point for the novel Base Map Software to analyze surrounding fault contact points 8-39, and identify and draw a fault line therethrough, such as shown in FIG. 9. As shown in FIG. 8, widget 8-33 has its pin 8-37 already centered on the selected fault contact point 8-39*a* so the widget would not have to be moved and centered on point 8-39*a*. The description in the next paragraph is given so that the reader understands how widget 8-33 would normally be moved to a chosen fault contact point, such as point 8-39*a*.

To move widget 8-33 to a fault contact point 8-39*a* the operator will place the mouse cursor on widget pin 8-37 and then operate mouse button MB-1. With button MB-1 held operated, the analysis operator moves the mouse cursor to place pin 8-37 on top of the chosen fault contact point 8-39*a*. Mouse button MB-1 is then released. Widget 8-33 will move and be displayed centered atop contact point 8-39*a*. The operator now may manually change other search parameters of widget 8-33. As previously described, these variable parameters are the search distance (radius of widget circle 8-41), the direction of the search as indicated by needle 8-35, (alternatively a bi-directional search in both directions of needle 8-35 may be indicated using the Pop-Up Menu as previously described with reference to FIG. 7A), and the angle of search about needle 8-35 which is the angle alpha of the pie section 8-36 on either side of needle 8-35.

To change the distance from point 8-39*a* to be searched for the next fault contact point in fault line 8-40*a,* the operator places the mouse cursor on the periphery of widget circle 8-41 and operates mouse button MB-1. With button MB-1 operated, the analysis operator either moves the mouse cursor in a direction external to the periphery of widget circle 8-41 as shown, or in a direction within the periphery of widget circle 8-41 as shown. As the mouse cursor is moved, widget 8-33 will contract or expand as indicated by the direction in which the mouse cursor was moved. When the operator releases mouse button MB-1 widget 8-33 will remain as re-drawn when mouse button MB-1 is released. As shown in FIG. 8, the periphery of widget 8-33 is set to fall beyond fault contact points 8-39*b* and 8-39*c* which the analysis operator believes may be part of a fault or horizon line including point 8-39*a*.

To set the direction to be searched for fault contact points in fault line 8-40*a*, the operator places the mouse cursor on needle 8-35 and operates mouse button MB-1. With button MB-1 operated, the analysis operator moves the cursor to a position indicating a new direction other than that previously indicated by needle 8-35. As the mouse cursor is moved needle 8-35 will be re-drawn to follow the cursor. When the operator releases mouse button MB-1 needle 8-35 will remain re-drawn pointing in the new direction indicated by the mouse cursor when button MB-1 is released. As shown in FIG. 8, the direction of needle 8-35 is as specified by the analysis operator. This direction is in the direction of fault contact points, such as point 8-39*b*&*c*, which the operator believes are along fault line 8-40*a*.

If the analysis operator wishes the Base Map Software to identify a fault line in both directions from the chosen fault contact point 8-39*a*, the operator will operate mouse button MB-3 and the Pop-Up Menu appears. The operator then selects Bi-directional in the Pop-Up Menu as previously described with reference to FIG. 7A, followed by selecting Create fault trace to perform the trend analysis. After the trend analysis is performed the bi-directional fault line will be displayed at shown in FIG. 9. If the operator only wants a unidirectional search performed, they de-select Bi-directional in the Pop-Up Menu and perform the trend analysis search as described above. The operator can also change the direction of the unidirectional search using the Moving Trend selection in the Pop-Up Menu.

Finally, the analysis operator may wish to change the angle of search about needle 8-35. As seen in FIG. 8, there is a pie shaped segment 8-36 centered on needle 8-35, and an identical pie shaped segment 8-36*a* centered on the backend of needle 8-35. The angular width of segment 8-36 sets the angle of search, in the search direction (unidirectional or bi-directional), in which the next fault contact point may be looked for. In the example shown in FIG. 8, under the search constraints imposed by widget 8-33, the Base Map Software will only be able to locate fault contact points 8-39 *b*&*c* and will thereby identify them as part of fault line 8-40*a*. Other fault contact points that fall within widget 8-33, such as points 8-39 *d*&*e*, are not identified as being part of fault line 8-40*a* because they full outside the specified search angle of segments 8-36 and 8-36*a*.

Once the Base Map Software has identified fault contact points 8-39 *b*&*c* as part of fault line 8-40*a*, the software then automatically uses identified fault contact point 8-39*b* as the next point about which to perform the same search analysis as described in the previous paragraph. In a second step of the trend analysis, centered on point 8-39*b*, the Software would identify fault contact point 8-39*f* as another point in fault line 8-40*a*. This process is repeated until all points in fault line 8-40*a* have been identified in the 30 degree direction. The process just described will then be repeated by moving to point 8-39*c* and subsequently identified points, such as point 8-39*g*, in performing the trend analysis in the 210 degree direction.

FIG. 9 shows the same video display as in FIG. 8 except that at the completion of fault contact point processing, and the selection of Create fault trace in the Pop-Up Menu of FIG. 7A as previously described, the identified points are connected on-screen to display fault line 9-40*a*. The analysis operator can then change the search analysis parameters using widget 9-33 and re-perform the analysis, as previously described, or can select another point 9-39 by moving widget 9-33, as previously described, and perform the trend analysis using the Base Map Software to identify another fault line, such as fault line 9-40*c* or 9-40*d*.

Figure 9A:
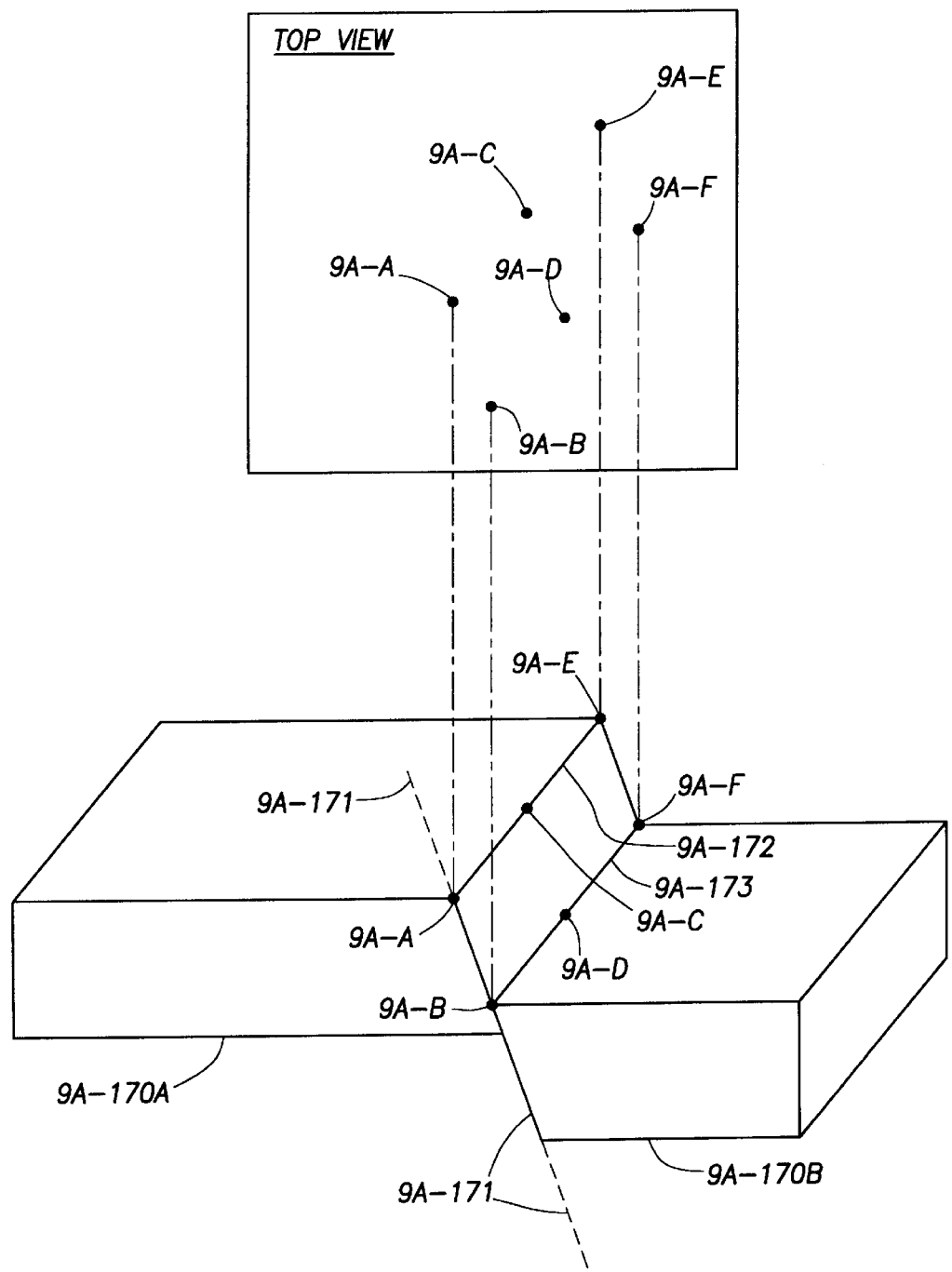
FIG. 9A shows an earth layer with a fault cutting therethrough along which the earth layer has shifted, and showing fault contact points thereon that are used for trend analysis in accordance with the teaching of the preferred embodiment of the invention.

FIG. 9A shows an orthogonal view of a simplified representation of an earth layer 9A-170, which may be a material such as limestone or shale, with a fault 9A-171 cutting therethrough along which earth layer 9A-170 has shifted creating two layer segments 9A-170A and 9A-170B, with layer segment 9A-170B being lower than layer segment 9A-170A. This creates fault lines 9A-172 and 9A-173. During seismic mapping, which is well-known in the art, and shown in FIGS. 1 and 2, seismic data is collected and stored. In processing the seismic data a plurality of fault contact points, such as points 9A-A through 9A-F, are mapped. In reality there would be many more points, but only a few are shown for simplicity. When these fault contact points are displayed on workstation display 6-32*a* as a top view they are seen as represented in the enclosed block in the upper portion of FIG. 26. These are the fault contact points 8-39 shown in FIG. 8 and point 9-39 in FIG. 9, and are used for the trend analysis performed using the widget 7-33 as described hereinabove with reference to FIGS. 7 and 8. When a trend analysis is performed, starting at one of points 9A A,C or E, and displayed using the teaching of the present invention, a trend line would be drawn through fault contact points 9A A,C &E in the upper part of FIG. 26 as shown.

FIG. 10 shows the first of a plurality of flow charts depicting the operation of the Base Map Software in accordance with the preferred embodiment of the invention. Several of the blocks in this flow chart, each indicated by a designation therein to another Figure—such as FIG. 11 in Initialization, are expanded in the indicated other Figure of the drawing. At Start block 10-43 the program is started by momentarily pressing mouse button MB-1, or by selecting the program from a menu, as previously described. In response thereto, the program progresses to the Initialization block 10-44 as shown in greater detail in FIG. 11. Briefly, in the Initialization step the widget search parameters that were previously used by the Software are read out and used in initially displaying the widget 8-33 at startup.

The next step in the program is the Draw Tool step 10-45, which is shown in greater detail in FIG. 12. In this step the previously used widget search parameters are used to display the widget 8-33 on workstation display 6-32*a* in the same position, with the same radius, needle direction and search angle as previously used. The analysis operator can now change the search parameters indicated by widget 8-33 as previously described with reference to FIG. 8. In addition, the operator may use the Pop-Up Menu of FIG. 7A to change other search trend parameters, also as previously described.

In Tool Ready block 10-59 (dashed line box) the program determines if the search parameters of the widget are being changed and re-positions and re-draws the widget 8-33 accordingly. At decision block 10-46 the program determines the X,Y coordinates of the mouse cursor on workstation display 6-32*a* when mouse button MB-1 is operated. At block 10-47 the program determines if this X,Y position of the mouse cursor is on the center pin 8-37 of widget 8-33 when mouse button MB-1 is operated. This is done to determine if the analysis operator wishes to move the widget 8-33 on display 6-32a to another fault contact point 8-39. If the mouse cursor is located on pin 8-37 when mouse button MB-1 is operated, the program branches to block 10-48, Move Pin program, to move and redraw widget 8-33 at the new location indicated by the mouse cursor. Widget 8-33 will then remain with its pin 8-37 at the new X,Y coordinates and the program progresses to exit block 10-55. As previously mentioned, as the mouse cursor is moved with mouse button MB-1 operated, widget 8-33 will move following the cursor before the mouse button is released. The Move Pin program is shown in greater detail in FIG. 13.

If a determination is made at decision block 10-47 that the mouse cursor is not positioned on pin 8-37 when mouse button MB-1 is operated, the program progresses via NO to decision block 10-49 to determine if the mouse cursor is positioned on needle 8-35 of widget 8-33, indicating that the search direction is to be changed. If the decision is yes, the program progress to block 10-50, Move Needle program, to move and redraw needle 8-35 at the new location indicated by the mouse cursor when mouse button MB-1 is released. As previously mentioned, as the mouse cursor is moved with mouse button MB-1 operated, needle 8-35 will move following the cursor before the mouse button is released. When mouse button MB-1 is released needle 8-35 will remain at the new X,Y coordinates and the program progresses to exit block 10-55. The Move Needle program is shown in greater detail in FIG. 14.

If the determination is made at block 10-49 that the mouse cursor is not positioned on needle 8-35, the program progresses at NO to decision block 10-51 to determine if the mouse cursor is positioned on the outer circle 8-41 of widget 8-33 when mouse button MB1 is operated. If the determination is yes, the program progresses to block 10-52, Move Ring program, to determine the final X,Y coordinates of the mouse cursor when mouse button MB-1 is released. As previously mentioned, as the mouse cursor is moved with mouse button MB-1 operated, the size of widget 8-33 will expand or contract following the cursor before the mouse button is released. When mouse button MB-1 is released widget 8-33 will remain at the final size and the program progresses to exit block 10-55. The Move Ring program is shown in greater detail in FIG. 15.

If the determination is made at block 10-51 that the mouse cursor is not positioned on circle 8-41 of widget 8-33, the program progresses to block 10-53 to determine if the mouse cursor is positioned on one of the edges 8-38 of pie segment 8-36 when mouse button MB-1 is operated. If the determination is yes, the program progresses to block 10-54, Move Arc program, to change the search angle and the width of pie segment 8-36 to that when mouse button MB-1 is released. This program, working in conjunction with the Draw Tool program in FIG. 12, re-draws pie segment 8-36 and the program goes to exit block 10-55. As previously mentioned, as the mouse cursor is moved with mouse button MB-1 operated, the pie segment 8-36 will expand or contract following the cursor before the mouse button is released. When mouse button MB-1 is released segment 8-36 will remain at the size it is displayed when the mouse button is released and the program goes to exit block 10-55. The Move Arc program is shown in greater detail in FIG. 16.

If the determination is made at block 10-53 that the mouse cursor is not positioned on one of the edges of pie segment 8-36 of widget 8-33 when mouse button MB-1 is operated, the program goes to exit block 10-55. At this block the program determines if the operator wishes to exit the program by operating the mouse button MB-2. If mouse button MB-2 is operated the decision is YES and the program progresses to Destroy Tool block 10-57 which causes the existing search parameters and Pop-Up Menu selections to be stored, and widget 8-33 is removed from the screen of work station display 6-32a. The operation of Destroy Tool block 10-57 is described in greater detail with reference to FIG. 18. At this point the program is at end block 10-58 and the program is terminated.

If mouse button MB-2 is not operated the operator does not want to terminate the Base Map Software program and the decision at block 10-55 is NO. The program progresses to decision block 10-56 where a decision is made as to whether mouse button MB-3 is operated indicating that the operator wishes to call up the Pop-Up Menu shown in FIG. 7A. If the decision is NO the program loops back to block 10-46 to repeat the steps that have already been described. If the decision is YES the program goes to Pop-Up Menu block 10-59, which is described in greater detail with reference to FIG. 17, and the Pop-Up Menu is displayed for use by the operator as previously described with reference to FIG. 7A.

Figure 11:
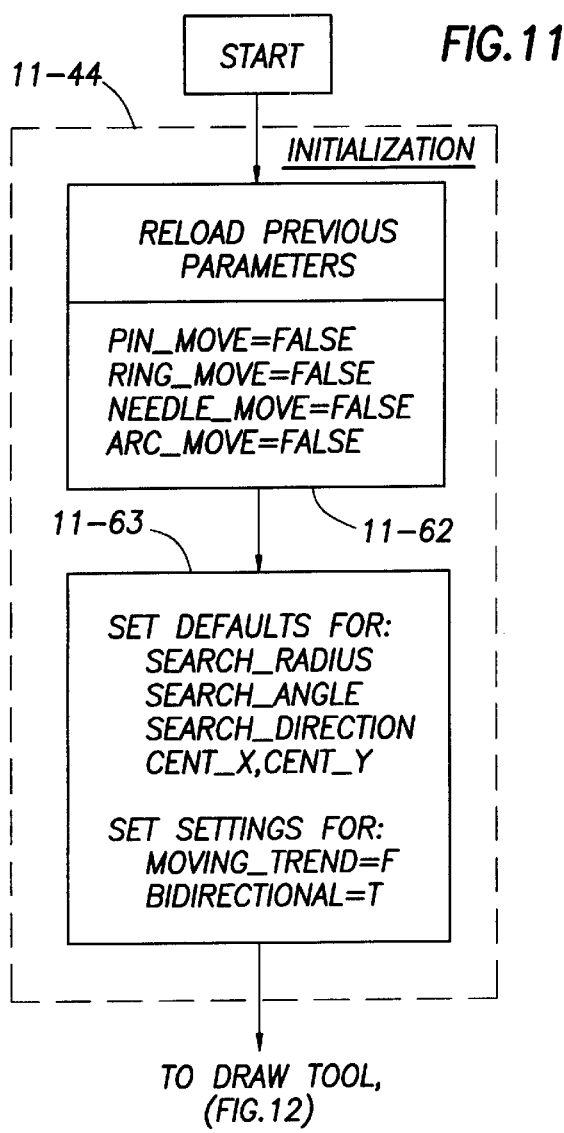
FIG. 11 is a flow chart of the Initialization program within the Base Map Software in accordance with the teaching of the preferred embodiment of the invention.

FIG. 11 shows a flow chart of the Initialization program 10-44 of FIG. 10. When the Base Map Software was previously used, at the time it's use was terminated by pressing mouse button MB-2, the previously described widget search parameters and Pop-Up menu selections were stored for use the next time the Base Map Software program is placed in use by the analysis operator. The first step during initialization in FIG. 11 is to re-load the previously stored search parameters at block 11-62. These will be used to display widget 8-33 in the same position with same parameters as previously used.

If the Base Map Software program has never been used before, there are no widget search and Pop-Up Menu parameters stored from a previous use. In this event the program progresses to block 11-63 where a default set of search parameters are read out and used to display widget 8-3 on workstation display 6-32a. Either way there is an initial set of parameters that are used to display widget 8-33 on workstation display 6-32a. The Initialization program exits and progresses to the Draw Tool program in FIG. 12. This sequence of operation is also seen in FIG. 10.

FIG. 12 is a flow chart of the Draw Tool program 10-45 shown in FIG. 10. The Draw Tool program is used to draw widget 8-33 on workstation display 6-32a using the initialization parameters determined with the Initialization program in FIG. 11. At block 12-64 the first step to be accomplished is to delete the present on-screen widget 8-33, if any. At block 12-65 the X,Y coordinates for the end of needle 8-35 are computed using the initialization parameters previously read out. At block 12-66 the program uses the stored search radius to calculate and draw ring 8-41 of widget 8-33.

Thereafter, at block 12-67 the program uses the stored Pop-Up Menu information to determine if a unidirectional or bi-directional search is to be performed. If the search is to be bi-directional, the program branches to block 12-68. At block 12-68 the program draws double pie sections 8-36 and 8-36a inside the ring (circle) 8-41 of widget 8-33 as shown in FIG. 8. In addition, at block 12-69 the program draws a double headed needle 8-35, as shown in FIGS. 8 and 9.

If instead the search is to be unidirectional, this is also determined by the directional toggle at block 12-67, and the program branches to block 12-70. At block 12-70 the program draws a single pie section inside the circle of widget 7-33 as shown in FIG. 7. In addition, at block 12-71 the program draws a single headed needle for the unidirectional search.

Whether a unidirectional or a bi-directional search is to be performed, at block 12-72 the program draws pin 8-37 at the center of widget 8-33.

The next step in the Draw Tool program in FIG. 12 is block 12-73 where angle marks are calculates and displayed every ten degrees around the periphery of widget circle 8-41. The angle marks for 90 degrees, 180 degrees, 270 degrees and 360 degrees are displayed more prominently than the other angle marks. Plot angle marks block 12-73 is described in greater detail with reference to FIG. 19.

At block 12-74 the Draw Tool program uses the widget circle radius and the X,Y coordinates of pin 8-37 to calculate the distance and angle of the outer end of needle 8-35 on the circular ring of widget 8-33 with reference to widget pin 8-37. Compute distance and angle block 12-74 is described in greater detail with reference to FIG. 20.

Using the X,Y information for pin 8-37 the Draw Tool program progresses to draw bearing block 12-75 where the numerical value, in degrees, of the direction in which needle 8-35 points is displayed just outside widget circle 8-41 adjacent to the tip of needle 8-35. This may be seen as the number "30" drawn near the tip of needle 7-35 in FIG. 7 and near the tip of needle 8-35 in FIG. 8, indicating that needle 7-35/8-35 is pointing in the direction of thirty degrees.

At this point the Draw Tool program has finished its operations and the program progresses to the Tool Ready program block 10-59 shown in FIG. 10. The Draw Tool program is re-initiated every time there is a change to be made to widget 8-33 to re-draw widget 8-33 in accordance with revised search parameters indicated by the analysis operator of workstation 6-32.

FIG. 13 is shows a flow chart of the Move Pin program 13-48, which is block 10-48 in FIG. 10. As briefly described above, when the analysis operator wishes to move widget 8-33 to a new location on workstation display 6-32a they position the mouse cursor on pin 8-37 and operates mouse button MB-1. The operator moves the mouse cursor while the button is operated, which drags widget 8-33 with it, to position pin 8-37 over a fault contact point 8-37 that is to be used for trend analysis. At the new cursor position mouse button MB-1 is released and widget 8-33 remains at the new position. The operation of mouse button MB-1 while the mouse cursor is positioned on pin 8-37 is determined by decision block 10-47 in FIG. 10. When widget 8-33 is to be moved the program branches to block 13-48 in FIG. 13 (block 10-48 in FIG. 10).

As the operator moves the mouse cursor, after having operated mouse button MB-1 while positioned on pin 8-37, block 13-72 periodically determines the X,Y position of the mouse cursor and passes this information to the Draw Tool program at block 13-73, after first storing the newer X,Y coordinates at block 13-73. The Draw Tool program is described in greater detail with reference to FIG. 12, but it uses each new pin 8-37 position, indicated by the X,Y coordinates periodically passed to it from block 13-72, to re-draw widget 8-33 at the newer position. The program then checks at block 13-75 to determine if mouse button MB-1 has been released. If button MB-1 has not been released the program returns to block 13-72 to re-determine newer X,Y coordinates of the mouse cursor, and widget 8-33 is again moved by the Draw Tool as just described. This process is repeated as long as mouse button MB-1 is operated. The visual effect on-screen is that widget 8-33 smoothly follows the mouse cursor. If mouse button MB-1 has been released the program exits decision block 13-75 at YES and returns to block 10-55 in FIG. 10.

FIG. 14 shows a flow chart of the Move Needle program 14-50, which is block 10-50 in FIG. 10. As briefly described above, when the analysis operator wishes to move needle 8-35 to point in a new search direction, they position the mouse cursor on needle 8-35 and operate mouse button MB-1. With the button held operated the operator then moves the mouse cursor, which drags needle 8-35 with it, to a new direction and mouse button MB-1 is released. When mouse button MB-1 is released needle 8-35 remains pointing in the new direction. The operation of mouse button MB-1 while the mouse cursor is positioned on needle 8-35 is determined by decision block 10-49 in FIG. 10. When needle 8-35 is to be moved the program branches to block 10-50 in FIG. 10 (block 14-50 in FIG. 14).

As the operator moves the mouse cursor, after having operated mouse button MB-1 while positioned on needle 8-35, block 14-76 periodically determines the X,Y position of the mouse cursor and passes this information to the Draw Tool program at block 13-73, after first computing the distance and new angle at block 14-77, and storing the newer X,Y coordinates at block 14-78. The Compute Distance and Angle program is described in greater detail with reference to FIG. 20. The Draw Tool program is described in greater detail with reference to FIG. 12, but it uses each new set of needle distance and angle information periodically passed to it, to re-draw needle 8-35 in the newer direction. At the same time pie segment 8-36 and the numerical degree indication just outside circle 8-41 are also changed. The program then checks at block 14-80 to determine if mouse button MB-1 has been released. If button MB-1 has not been released the program returns to block 14-76 to re-determine newer X,Y coordinates of the mouse cursor, and needle 8-35 is again moved as just described. This process is repeated as long as mouse button MB-1 is operated. The visual effect on-screen is that needle 8-35 smoothly follows the mouse cursor. If mouse button MB-1 has been released the program exits decision block 14-80 at YES and returns to block 10-55 in FIG. 10.

FIG. 15 shows a flow chart of the Move Ring block program 15-52, which is block 10-52 in FIG. 10. As briefly described above, when the analysis operator wishes to change the search radius of widget 8-33 on workstation display 6-32a they position the mouse cursor on ring/circle 8-41 of widget 8-33 and operates mouse button MB-1. The operator then moves the mouse cursor while the button is operated, which drags circle 8-41 with it, to a new larger or smaller radius. This indicates a new larger are smaller search radius for the search program. At the new search radius mouse button MB-1 is released and circle 8-41 of widget 8-33 remains at the new radius. The length of needle 8-35, sides 8-38 of pie segment 8-36, and the thirty degree indication outside circle 8-41 are also changed to match the smaller or larger widget 8-33. The operation of mouse button MB-1 while the mouse cursor is positioned on circle 8-41 is determined by decision block 10-51 in FIG. 10. When the search radius is to be moved the program branches to block 15-52 in FIG. 15 (block 10-52 in FIG. 10).

As the operator moves the mouse cursor, after having operated mouse button MB-1 while positioned on circle 8-41, block 15-81 periodically determines the X,Y position of the mouse cursor and passes this information to the Draw Tool program at block 15-84, after first using the Re-scale Tool at block 15-82, and storing the newer search radius at block 15-83. The Re-scale Tool program is described in greater detail with reference to FIG. 21. The Draw Tool program is described in greater detail with reference to FIG. 12, but it uses each new set of information periodically passed to it, to re-draw widget 8-33 with the newer search radius. The program then checks at block 15-85 to determine if mouse button MB-1 has been released. If button MB-1 has not been released the program returns to block 15-81 to redetermine newer X,Y coordinates of the mouse cursor, and the radius all of circle 8-41 is again changed as just described. This process is repeated as long as mouse button MB-1 is operated. The visual effect on-screen is that widget 8-33 smoothly expands or contracts following the mouse cursor. If mouse button MB-1 has been released the program exits decision block 15-85 at YES and returns to block 10-55 in FIG. 10.

Figure 16:
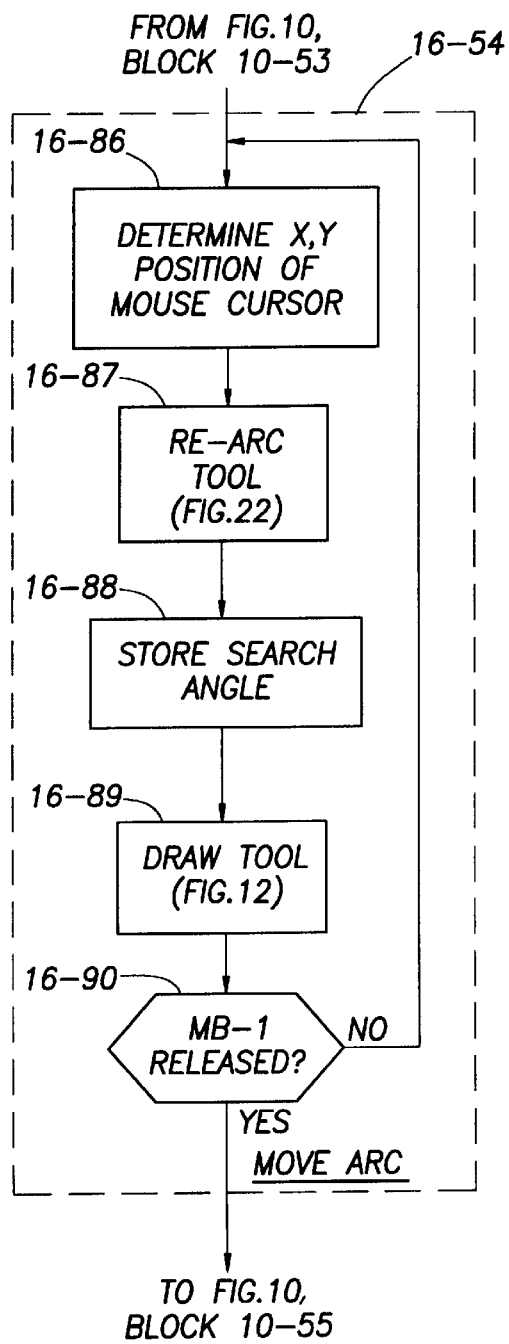
FIG. 16 is a flow chart of the Move Arc program within the Base Map Software in accordance with the teaching of the preferred embodiment of the invention.

FIG. 16 shows a flow chart of the Move Arc program 16-54, which is block 10-54 in FIG. 10. As briefly described above, when the analysis operator wishes to change the angle of search of pie segment 8-36 on widget 8-33 they position the mouse cursor on one of the sides 8-38 of pie segment 8-36 and operate mouse button MB-1. The operator then moves the mouse cursor while the button is operated, which drags the sides 8-38 with it, to a new larger or smaller search angle. This indicates a new larger or smaller search angle to the search program. At the new search angle mouse button MB-1 is released and the angular width of pie segment 8-36 remains at the new angle. The operation of mouse button MB-1 while the mouse cursor is positioned on a side 8-38 is determined by decision block 10-53 in FIG. 10. When the search angle is to be changed the program branches to block 16-54 in FIG. 16 (block 10-54 in FIG. 10).

As the operator moves the mouse cursor, after having operated mouse button MB-1 while positioned on a side 8-38 of pie segment 8-36, block 16-86 periodically determines the X,Y position of the mouse cursor and passes this information to the Draw Tool program at block 16-89, after first using the Re-Arc Tool at block 16-87, and storing the newer search angle at block 16-88. The Re-Arc Tool program 16-87 is described in greater detail with reference to FIG. 22. The Draw Tool program is described in greater detail with reference to FIG. 12, but it uses each new set of information periodically passed to it, to re-draw pie segment 8-36 with the newer search angle. The program then checks at block 16-90 to determine if mouse button MB-1 has been released. If button MB-1 has not been released the program returns to block 16-86 to re-determine newer X,Y coordinates of the mouse cursor, and the search angle of pie segment 8-36 is again changed as just described. This process is repeated as long as mouse button MB-1 is operated. The visual effect on-screen is that the angle of pie segment 8-36 smoothly expands or contracts following the mouse cursor. If mouse button MB-1 has been released the program exits decision block 16-90 at YES and returns to block 10-55 in FIG. 10.

Figure 17:
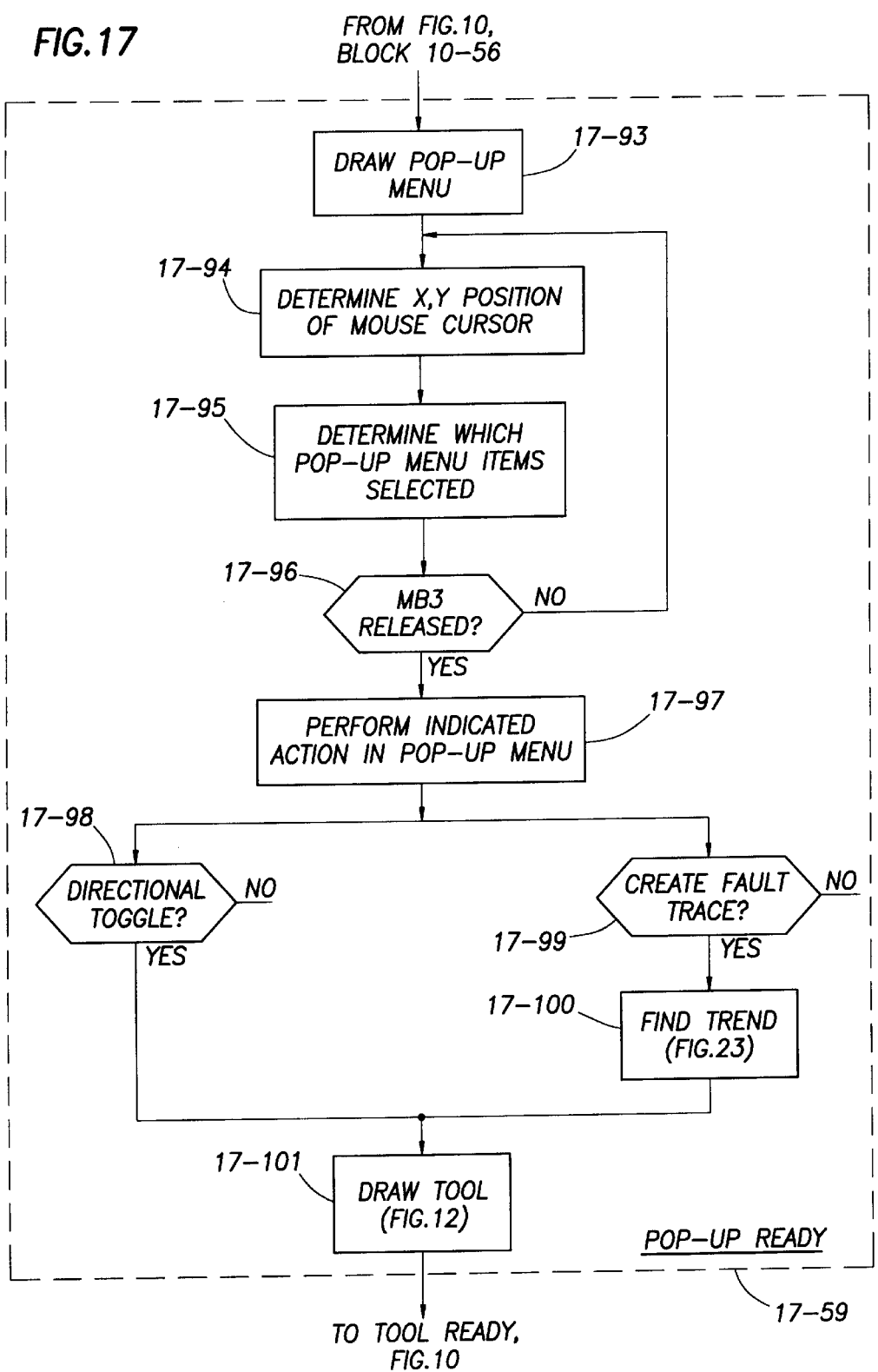
FIG. 17 is a flow chart of the Pop-Up Ready program within the Base Map Software in accordance with the teaching of the preferred embodiment of the invention.

FIG. 17 shows a flow chart for the Pop-Up Ready tool program. This program is block 10-59 in FIG. 10 and block 17-59 in FIG. 17. The purpose of this program is to call up the pop-up menu shown in FIG. 7A and perform functions and set parameters in response to pop-up menu items selected by the analysis operator. Pop-Up Ready program is called by the decision block 10-56 in FIG. 10 when the operator presses mouse button MB-3. The operator selects search functions and parameters by placing the mouse cursor on items in the Pop-Up Menu and releasing mouse button MB-3 to perform the indicated functions and change the selected parameters.

As shown in FIG. 7A, menu item Bi-directional has been selected, as represented by the "X" adjacent thereto, and a bi-directional search will be performed when the operator subsequently selects Create Fault Trace on the menu by placing the mouse cursor thereon and releasing mouse button MB-3.

When the operator places the mouse cursor on "Create fault trace" and releases mouse button MB-3 the Base Map Software will generate a fault trace using the current widget search settings. With reference to FIGS. 8 and 9, the operator will have set the search parameters as reflected by the settings of widget 8-33 as shown in FIG. 8 and in the Pop-Up Menu. Upon the operator selecting "Create fault trace" by releasing mouse button MB-3 when the cursor is placed thereon the program will generate the bi-directional fault line shown the FIG. 9.

If the operator places the mouse cursor on "Undo fault trace" and releases mouse button MB-3 the program will remove the latest fault trace generated. That is, the fault trace as shown in FIG. 9 will be removed and the screen of the workstation display 6-32a will again appear as shown in FIG. 8.

Should the operator select "Undo all" by placing the mouse cursor thereon and releasing mouse button MB-3 the program will remove all fault traces previously generated and displayed on workstation display 6-32a.

The last three operator selected items on the Pop-Up Menu are "Moving Trend", "Bi-directional", and "Show Midpoints". When the operator selects Moving Trend by placing the mouse cursor thereon and releasing mouse button MB-3, the program changes the search direction based on previously identified fault contact points. That is, in FIG. 7 the unidirectional search will be performed in the direction of thirty degrees, but if Moving Trend is selected by placing the mouse cursor thereon and releasing mouse button MB-3, the search directional will be switched to two-hundred ten degrees. The needle head on the end of needle 8-35 will switch to the opposite end of the needle and point to two-hundred ten degrees. At the same time the display of thirty degrees on the periphery of widget circle 8-41 will disappear and the display of 210 degrees will appear (not shown in FIG. 7 or 8). When the operator selects Bi-directional by placing the mouse cursor thereon and releasing mouse button MB-3, the program will search in both directions of needle 8-35 when the operator selects Create fault trace. In addition, when the operator has selected Bi-directional by placing the mouse cursor thereon and releasing mouse button MB-3, needle 8-35 has an needle head displayed on both ends of the needle as shown in FIGS. 8 & 9, but not in FIG. 7. When Bi-directional is not selected the bi-directional fault line displayed in FIG. 9 will not be shown. When the operator selects Show Midpoints by placing the mouse cursor thereon and releasing mouse button MB-3 the program will display midpoints along the displayed fault line.

In FIG. 17, when the operator operates mouse button MB-3 block 17-93 generates and displays the Pop-Up Menu on workstation display 6-32a. At block 17-94 the program determines the X,Y coordinates of the mouse cursor and, using this information, in block 17-95 determines which of the above discussed menu items, if any, the mouse cursor is positioned on. At block 17-96 the program decides if mouse button MB-3 has been released. If mouse button MB-3 is not positioned on a menu item when it is released no actions will be performed and no states, such as Bi-directional, will be selected.

If mouse button MB-3 is not released the program cycles back to block 17-94 and performs the actions described immediately above. If mouse button MB-3 is released the program progress to block 17-97 to perform the selected action in the selected Pop-Up Menu. Those actions are described above. The program progresses to decision block 17-98 which sets the Bi-directional toggle for this selection and causes an indication to be placed adjacent to the word Bi-directional in the Pop-Up Menu as shown in FIG. 7A. The program also checks at block 17-99 to see if Create Fault Trace has been selected. If it has been selected by the operator, the program progresses to block 17-100 to run the Find Trend program which is described in detail with reference to FIG. 23. Responsive to the operation of the Find Trend program, lines interconnecting fault contact points 8-37 are determined and drawn as shown in FIG. 9. Changes in the display are caused by the program progressing to the Draw Tool program 17-101 which is described in greater detail with reference to FIG. 12. At this point the Pop-Up Ready program is completed.

Figure 18:
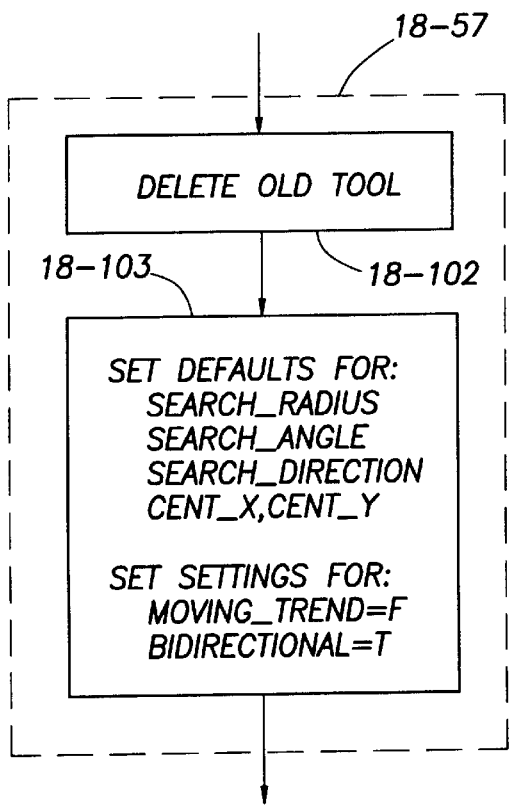
FIG. 18 is a flow chart of the Destroy Tool program within the Base Map Software in accordance with the teaching of the preferred embodiment of the invention.

FIG. 18 shows a flow chart for the Destroy Tool program 18-57, which is also shown as block 10-57 in FIG. 10. As previously mentioned the purpose of this program is to remove a previously displayed widget 8-33 before a replacement widget is displayed responsive to any new parameters indicated by the analysis operator, and when the Base Map Software is terminated. As previously described, a new widget is displayed using the Draw Tool program in FIG. 12. Accordingly, at block 18-102 the first step is to delete the previous widget 8-33. The next step, at block 18-103, is to save the currently used parameters for search radius, search angle, search direction, X,Y coordinates for the pin, is the search unidirectional or bi-directional, and the moving trend for future use before the program is terminated.

Figure 19:
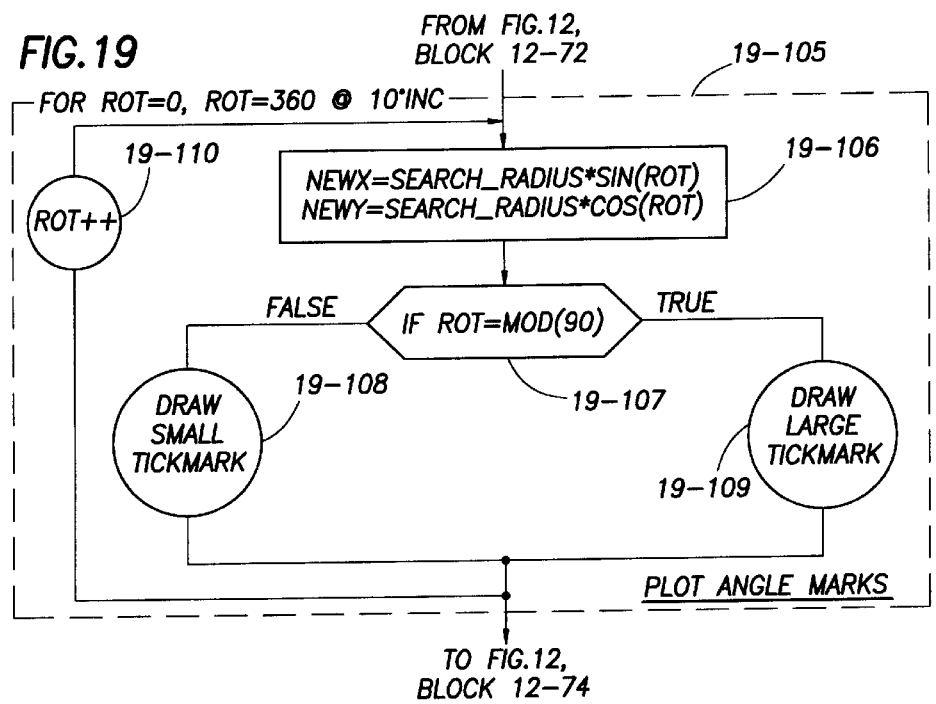
FIG. 19 is a flow chart of the Plot Angle Marks program within the Base Map Software in accordance with the teaching of the preferred embodiment of the invention.

FIG. 19 shows the flow chart for the Plot Angle Marks program 19-105 which is shown in FIG. 12 as block 12-73. The purpose of this program is to plot and display angle marks every ten degrees around the periphery of widget circle 8-41. The angle marks for 90 degrees, 180 degrees, 270 degrees and 360 degrees are displayed more prominently than the other angle marks. In block 14-106 the X,Y coordinates of each angle mark to be displayed are calculated. This is done by using the search radius of widget 8-33, which is the length of needle 8-35, and using the following equations. X (at angle alpha)=radius x cosine(angle alpha) and Y(at angle alpha)=radius x sine(angle alpha); and angle alpha is every ten degree angle between zero and three-hundred sixty degrees.

The Plot Angle Marks program then progresses to block 19-107 which determines if the computed angle mark is an integral of ninety degrees. If the determination is made that an angle mark is not an integral of ninety degrees, the program progresses to block 19-108 which causes a small tick mark to be drawn on the periphery of widget circle 8-41 at the angle used for calculation. If the determination is made that an angle mark is an integral of ninety degrees, the program progresses to block 19-109 which causes a large tick mark to be drawn on the periphery of widget circle 8-41 at the angle used for calculation. The larger tick marks at 90 degrees, 180 degrees, 270 degrees and 360 degrees are seen in FIGS. 7, 8 and 9.

After each small or large tick mark is calculated and displayed on the periphery of widget circle 8-41, at block 19-110 the angle used for calculation is incremented by ten degrees and the above described calculations are repeated. This process is repeated until all tick marks are calculated and displayed, at which time the program exits and returns to block 12-74 in FIG. 12.

Figure 20:
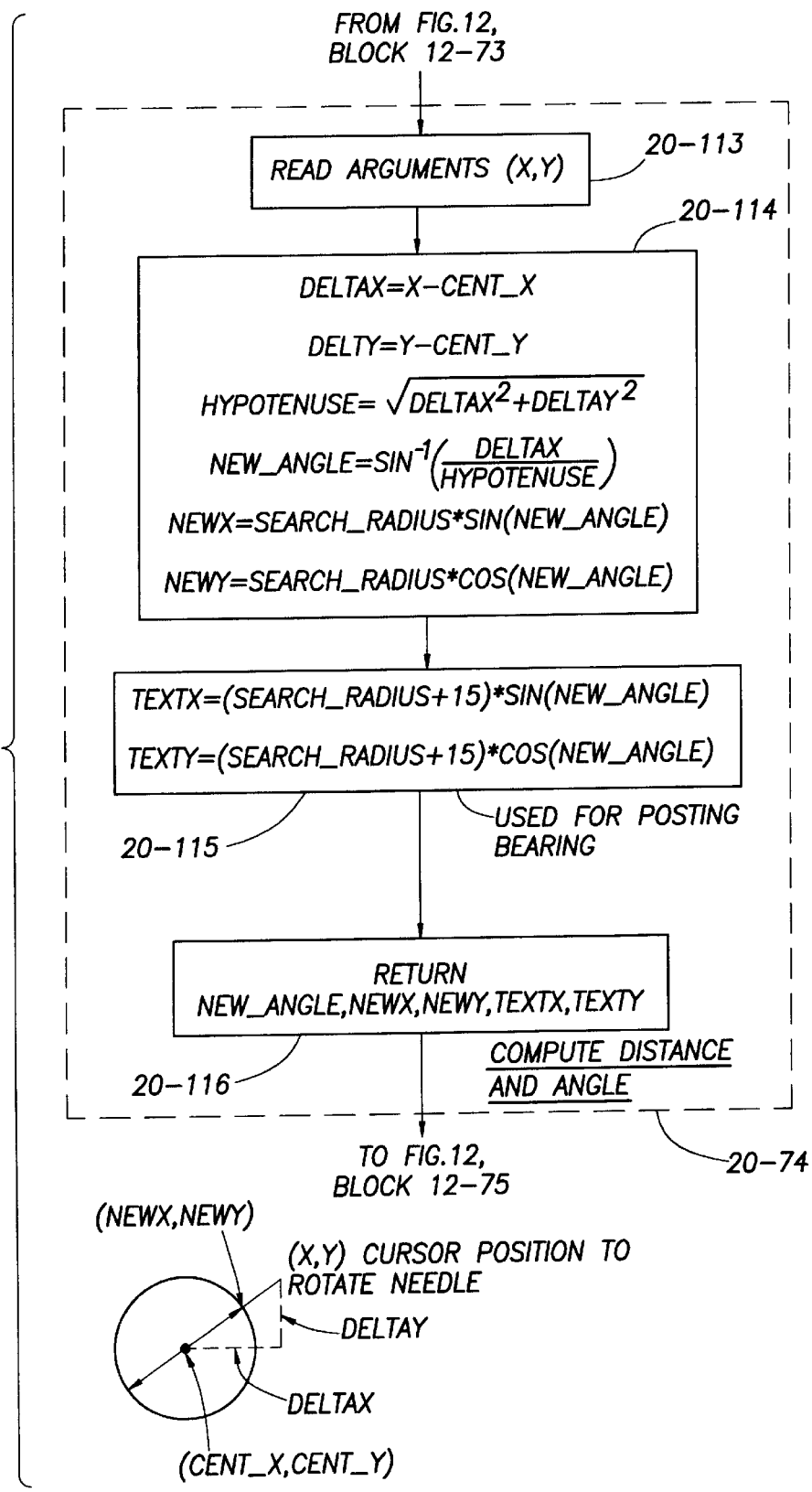
FIG. 20 is a flow chart of the Compute Distance Angle program within the Base Map Software in accordance with the teaching of the preferred embodiment of the invention.

FIG. 20 is the Compute Distance and Angle program 20-74 used in Draw Tool program in FIG. 12 and shown therein as block 12-74. This program is used to initially place the directional search needle 8-35 on widget 8-33, and to change the direction of the search needle 8-35.

At block 20-113 the program reads the X,Y coordinates of the tip of needle 8-35 and those for pin 8-37 from storage. At block 20-114 the program utilizes the X,Y coordinates for both the tip of needle 8-35 and pin 8-37 and applies the Pythagoreum Theorem in a well-known manner to calculate the distance (length of hypotenuse) and angle to the tip of needle 8-35 from pin 8-37. At block 20-115 the program converts the calculated angle of needle 8-35 to a numerical figure which is the angle bearing posted just outside circle 8-41 of widget 8-33. In FIGS. 7, 8 and 9 it is the number "30" and indicates that needle 8-35 is pointing to thirty degrees. At block 20-116 the program saves the newly calculated distance and angle information for needle 8-35. This information is then used by the Draw Tool program to properly display needle 8-35 and its angle on widget 8-33. At this point the Compute Distance and Angle program is ended and the program goes to FIG. 12, block 12-75.

FIG. 21 is a Re-scale Tool program 21-82 that is used to change the search radius of widget 8-33, which is the radius of the circle 8-41 of the widget. The Re-scale Tool program is called by the Move Ring program in FIG. 15. During operation of the Base Map Software the analysis operator may wish to change the search radius used by the Software. To do this the operator places the mouse cursor anywhere on circle 8-41 of widget 8-33, presses and holds mouse button MB-1, and then moves the mouse cursor inside or outside the existing search radius circle 8-41. As mentioned previously the widget size changes smoothly following the mouse cursor. When the operator reaches the desired new search radius they release mouse button MB-1 and widget 8-33 remains displayed at the new search radius. In implementing this operation the new search radius calculated by the Re-scale Tool program is returned to the Move Ring program in FIG. 15 which in turn performs its functions and calls the Draw Tool program to display widget 8-33.

In performing this operation, at block 21-119 the Re-scale Tool program first determines the X,Y coordinates of the mouse cursor at the new search radius when mouse button MB-1 is released. Using the X,Y coordinates at the point marked by the mouse cursor when mouse button MB-1 is released, and the X,Y coordinates of pin 8-37, at block 21-120 the program utilizes the Pythagoreum Theorem, in a well-known manner, to calculate the distance (length of hypotenuse) from pin 8-37 to the newly indicated X,Y mouse cursor coordinates for the new search radius of widget 8-33. The above mentioned calculation is better understood when viewing the small inset figure in FIG. 21 adjacent to block 20-82.

At block 21-121 the Re-scale Tool program returns the newly calculated search radius to be stored and used by other programs, such as the Move Arc program in FIG. 16 and the Draw Tool program in FIG. 12 to re-draw widget 8-33 with the new search radius. At this point the Re-scale Tool program is terminated and the program progresses to FIG. 15, block 15-83.

Figure 22:
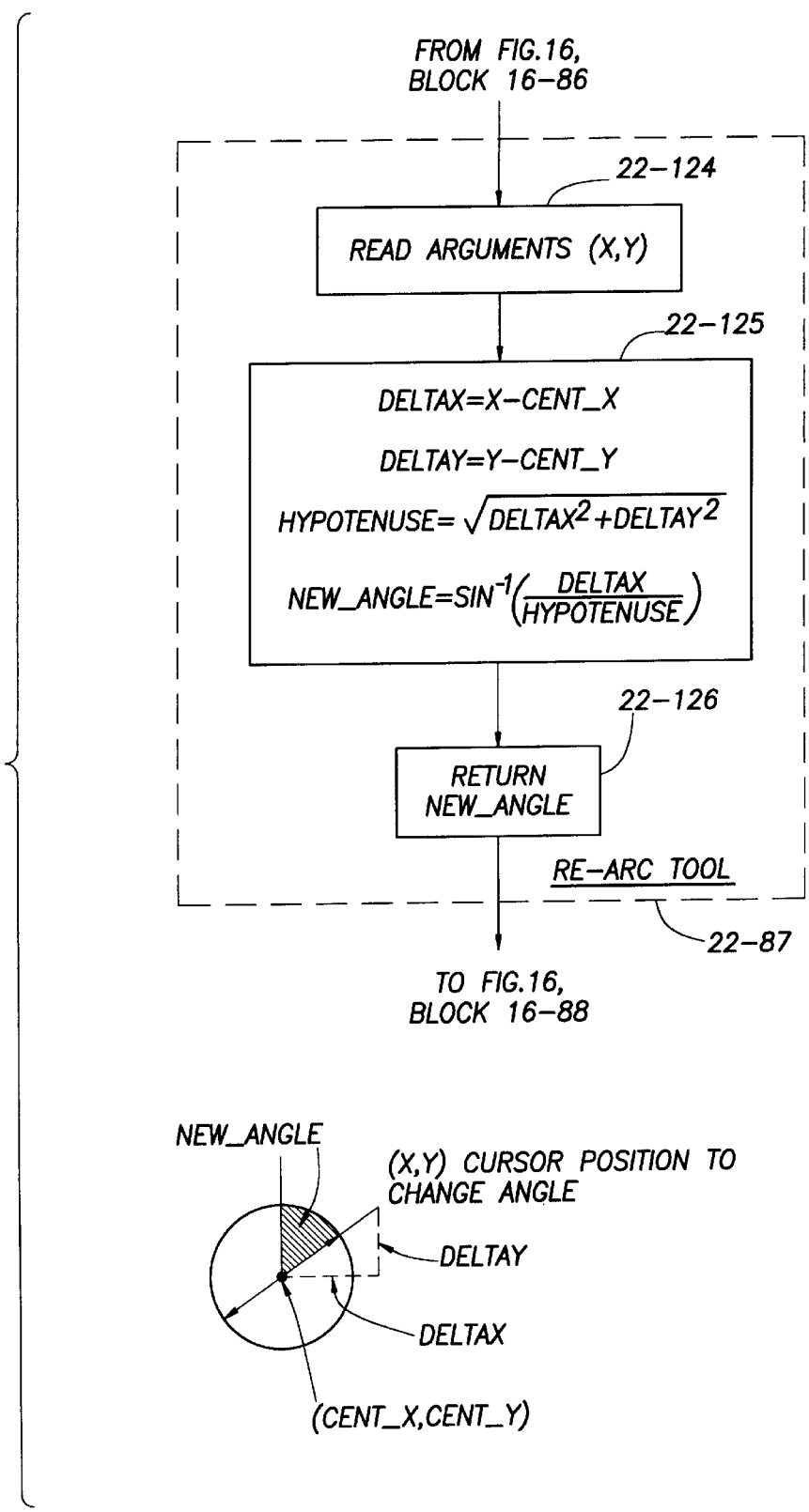
FIG. 22 is a flow chart of the Re-Arc Tool program within the Base Map Software in accordance with the teaching of the preferred embodiment of the invention.

FIG. 22 is a Re-arc Tool program 22-87 that is used to change the search angle of the pie segment 8-36 of widget 8-33. This program is utilized by the Move Arc program shown in FIG. 16 where it is shown as block 16-87. The Re-arc Tool program is utilized when the analysis operator indicates they wish to change the search angle of widget 8-33 by placing the mouse cursor on an edge 8-38 of search angle pie segment 8-36 and pressing mouse button MB-1.

The operator then moves the mouse cursor to expand or contract the size of the angle of pie segment 8-36 to a new search angle and releases mouse button MB-1. As mentioned previously the displayed pie segment 8-36 changes smoothly following the mouse cursor.

At block 22-124 the Re-arc Tool program reads from storage the X,Y coordinates of pin 8-37. Progressing to block 22-125 the program utilizes the pin X,Y coordinates and the mouse cursor X,Y coordinates when mouse button MB-1 is released in the Pythagoreum Theorem, in a well-known manner, to re-calculate the new search width angle with respect to pin 8-37. At block 22-126 the newly calculated search width angle is stored for use by other programs, such as the Draw Tool program in FIG. 12, which draws widget 8-33. At this point the Re-arc Tool program is terminated and the program progresses to FIG. 16, block 16-88. The above mentioned calculation performed is better understood when viewing the small inset figure in FIG. 22 adjacent to block 22-87.

Figure 23:
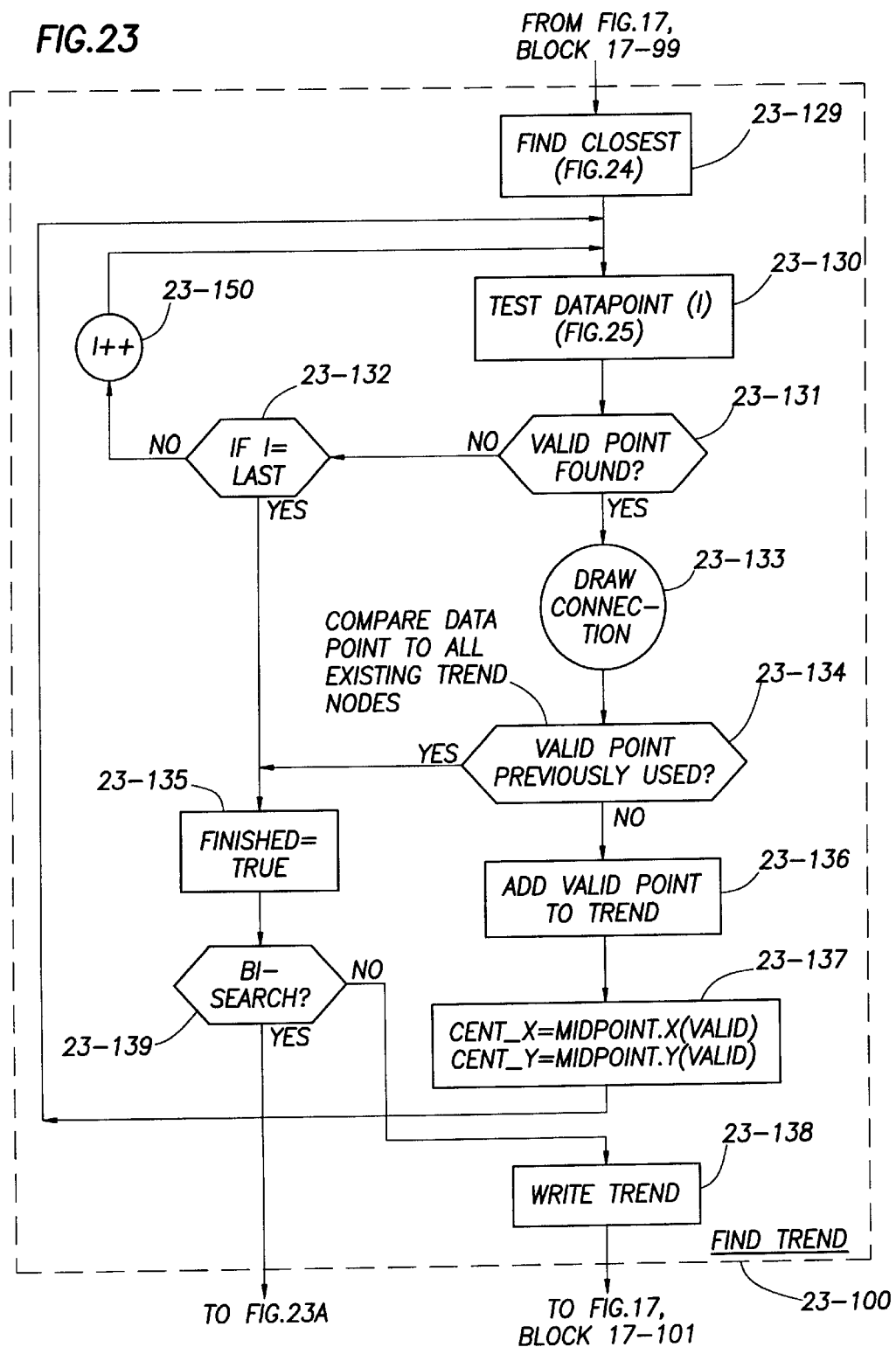
FIG. 23 is a flow chart of the Find Trend program within the Base Map Software, used to find a trend in only one direction from the center pin of the widget tool, in accordance with the teaching of the preferred embodiment of the invention.

FIGS. 23 and 23A are a Find Trend program that is utilized after all widget 8-33 parameters have been set for a trend search. The analysis operator presses and holds mouse button MB-3 to display the Pop-Up Menu of FIG. 7A, selects "Create fault trace" with the mouse cursor, and releases mouse button MB-3. The performance of a unidirectional search utilizes only FIG. 23, and the performance of a bi-directional search also utilizes FIG. 23A. As generally described hereinabove the program starts with fault contact point 8-39a on which has been placed pin 8-37. The software then looks for the closest fault contact point 8-39b within the search radius and the search angle of widget 8-33 and draws a line from pin 8-37 to that closest fault contact point. The program then utilizes the first closest fault contact point 8-39b as the starting point for another search, looks for the closest fault contact point 8-39f thereto, and draws a line thereto. This step-by-step trend search process is repeated until all possible points have been identified, and a trend line drawn between those points (as shown in FIG. 9), in a first direction from pin 8-37. If only a unidirectional trend search has been selected using the Pop-Up Menu of FIG. 7A, as previously described, the trend search stops here. The trend line is only shown upward to the right from fault contact point 8-39a.

If a bi-directional trend search has been requested by the analysis operator using the Pop-Up Menu of FIG. 7A, as previously described, the above described procedure would then be repeated in the opposite direction from pin 8-37 until all possible points (8-39c, 8-39g, etc.) have been identified in that direction, and a trend line drawn between those points. The result would be the bi-directional fault trend line 9-40a shown in FIG. 9.

Figure 24:
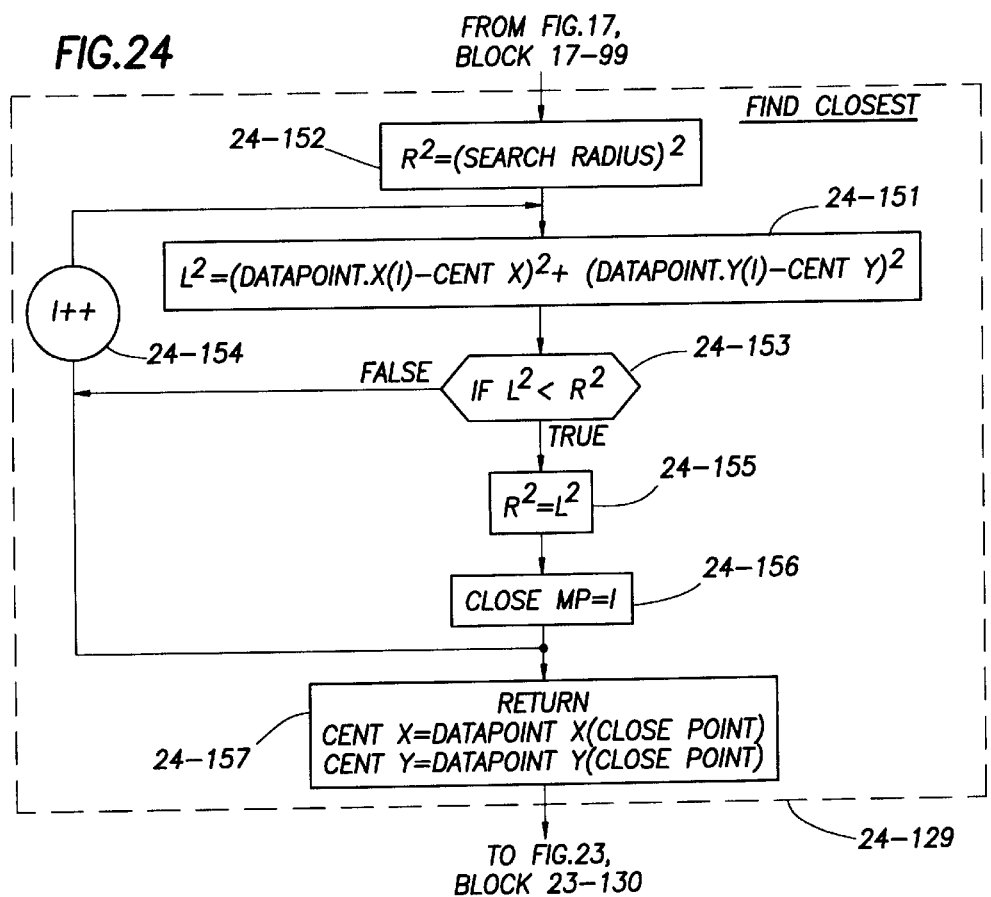
FIG. 24 is a flow chart of the Find Closest program within the Base Map Software in accordance with the teaching of the preferred embodiment of the invention.

In FIG. 23, at block 23-129 the Find Closest program of FIG. 24 is first used to identify the closest fault contact point to point 8-39a that lies within the search radius shown by circle 8-41 of widget 8-33. The Find Closest program is described in detail elsewhere in this Detailed Description. The program then progresses to block 23-130 to run the Test Datapoint program that is shown in greater detail in FIG. 25 and described in detail elsewhere in this Detailed Description. The Test Datapoint program checks the closest fault contact point located by the Find Closest program 23-129 to determine if it lies within the operator specified search angle shown as pie segment 8-36. If the fault contact point being tested does not lie within the search angle, the Find Closest program at block 23-129 and the Test Datapoint program at block 23-120 continue to test fault contact points displayed on workstation 6-32a until the closest fault contact point 8-39a is identified. At block 23-131 the Fault Trend program checks the output of block 23-130 and if it NULL, indicating an invalid point, the program branches to NO to block 23-132. At block 23-132, if the last contact data point is not being checked, the program again branches at NO, and block 23-150 causes the next fault contact point 8-39 to be tested at block 23-120 to determine if it falls within the search angle of widget 8-33.

If a valid fault contact point 8-39 is determined by block 23-131 (falls within the widget search angle), it is the closest fault contact point 8-39b to point 8-39a and lies on trend line 8-40a. The program then progresses to block 23-133 and draws a connection between points 8-39a and 8-39b. Alternately, all identified, valid fault contact points along a trend line may be saved until the trend analysis is completed and all connections between the points are drawn at one time.

A test is then made at block 23-134 to determine if the point just identified as valid has been previously used in the trend line (8-40a for example). If the determination is no, the program progresses to block 23-136 where it adds the "valid" data point (fault contact point) to the trend line database. If the determination is yes, the program branches at YES to block 23-135.

The valid data point is then forwarded to block 23-137 where the mid-point of each connecting line between every adjacent pair of valid data points (e.g. 8-39a and 8-39b) is determined and used if the analysis operator operates mouse button MB-3 and selects "Show midpoints" from the Pop-Up Menu. Responsive to the "Show midpoints" selection the program uses the information calculated at block 23-137 to display midpoints on each connecting line between two valid data points, such as fault contact points 8-39a and 8-39b.

Upon exiting block 23-127 the Find Trend program returns back to block 23-120 to test the next fault contact point received from the Find Closest program in the manner just described. This process is repeated until all valid fault contact points (data points) in trend line 8-40a are determined in the one direction from starting fault contact point 8-39a and passing through points 8-39 b&f.

When the last fault contact point 8-39 has been located on trend line 8-40a in the direction starting fault contact point 8-39a and passing through points 8-39 b&f, the decision made at block 23-131 is NO. Since the point is the last valid point the decision at block 23-132 is YES and an indication is sent to block 23-125 to set a switch indicating that the program is finished trend searching in that direction. This "Finished" indication is passed to block 23-139 where it is determined if a bi-directional search has been requested by the analysis operator selecting "Bi-directional" in the Pop-Up Menu of FIG. 7A in the manner previously described. If a bi-directional search has not been requested, the program branches from block 23-139 at NO to block 23-138 where the valid fault contact point (data point) is stored and the program then exits to the Pop-Up Ready program in FIG. 17, block 17-101. If a bi-directional search has been requested, the program branches from block 23-139 at YES to the remainder of the Find Trend program in FIG. 23A.

The first step in the portion of the Find Trend program in FIG. 23A is at block 23A-140 where the search direction is reset so that the trend analysis performed thereafter will find fault contact points in the opposite direction of point 8-39a. Examples of points in this portion of the bi-directional search direction are points 8-39 c&g. From this point on, the method of searching for fault contact points in trend line 8-40a are exactly the same as described with reference to FIG. 23. The exception is that when the last of valid fault contact points are located, the program exits at the NO branch of block 23A-142 and the YES branch of decision block 23A-143 to write an indication that the search is finished in block 23A-146. Then, at block 23A-149 the valid fault contact points located in the bi-directional portion of the search are recorded. The Find Trend program then exits to the Pop-Up Ready program on FIG. 17, block 17-101.

FIG. 24 shows a flow chart for the Find Closest program 24-129 that is used by the Find Trend program in FIG. 23 during the trend search called from the Pop-Up Menu of FIG. 7A to find the closest fault contact point 8-39 to point 8-39a that is within the search radius. At block 24-152 the program initially looks up the existing search radius of widget 8-33, which is the radius of widget circle 8-41, and squares the value (R2). At block 24-151 the program utilizes the Pythagoreum Theorem, in a well-known manner, along with the X,Y coordinates of fault contact point 8-39a (at pin 8-37) to calculate the squared distance (hypotenuse squared=$L^2$) from pin 8-37 to a first input fault contact point 8-39 from a list of fault contact points.

At block 24-153, the program compares $L^2$ from block 24-151 to $R^2$ (initially the search radius) from block 24-152. If $L^2$ is less than $R^2$ this indicates that the point 8-39 being tested falls within search radius of widget 8-33 and the program branches at TRUE to block 24-155 where the last mentioned $L_2$ value is stored as the value for $R^2$ which will be used for testing the next fault contact point. If $L^2$ is greater than $R^2$, the point is outside the search radius of widget 8-33 and the program branches at FALSE to block 24-154 which calls the X,Y coordinates for the next fault contact point and re-performs the analysis just described except $R^2$ is now the value determined at block 24-155 and not the value from block 24-152. If the first fault contact point 8-39 tested fell outside the widget circle 8-41 $R^2$ is still equal to the search radius of widget 8-33. If the first fault contact point 8-39 tested inside widget circle 8-41 $R^2$ is now equal to the first calculated value for $L^2$.

As the Find Closest program 24-129 cycles through blocks 24-151, 24-153 and 24-154 for each fault contact point 8-39, if a subsequent fault contact point is closer to pin 8-37 than any previous point, its calculated value for $L^2$ at block 24-151 will replace any previous value stored at block 24-155. In this manner, after all fault contact points 8-39 have been tested in the above described manner, only the result from testing point 8-39b will stored as the closest point because it is the closest fault contact point to pin 8-37.

As the find closest search analysis described in the previous two paragraphs is performed, for each value of $L^2$ stored in block 24-155, block 24-156 temporarily stores the X,Y coordinates of the particular fault contact point as the values for the closest fault contact point. After testing of all fault contact points 8-39 has been completed the X,Y coordinates stored in block 24-156 are permanently stored at block 24-157.

After the closest fault contact point is found to point 8-39a in the first direction of trend analysis, which is point 8-39b, the Find Closest program now uses point 8-39b as the center point and repeats the above described analysis to find another fault contact point 8-39 that is closest to point 8-39b. As may be seen in FIG. 8, the next point to be identified as the closest point would be point 8-39f.

After all fault contact points 8-39 in fault line 9-40a have been identified in the first direction, the Find Trend program again uses the Find Closest program to perform the same closest point analysis and identify all points 8-39 in the opposite direction along fault line 9-40a. When Find Closest program 24-129 has finished its analysis it exits to FIG. 23, block 23-130 (Find Trend program).

Figure 25:
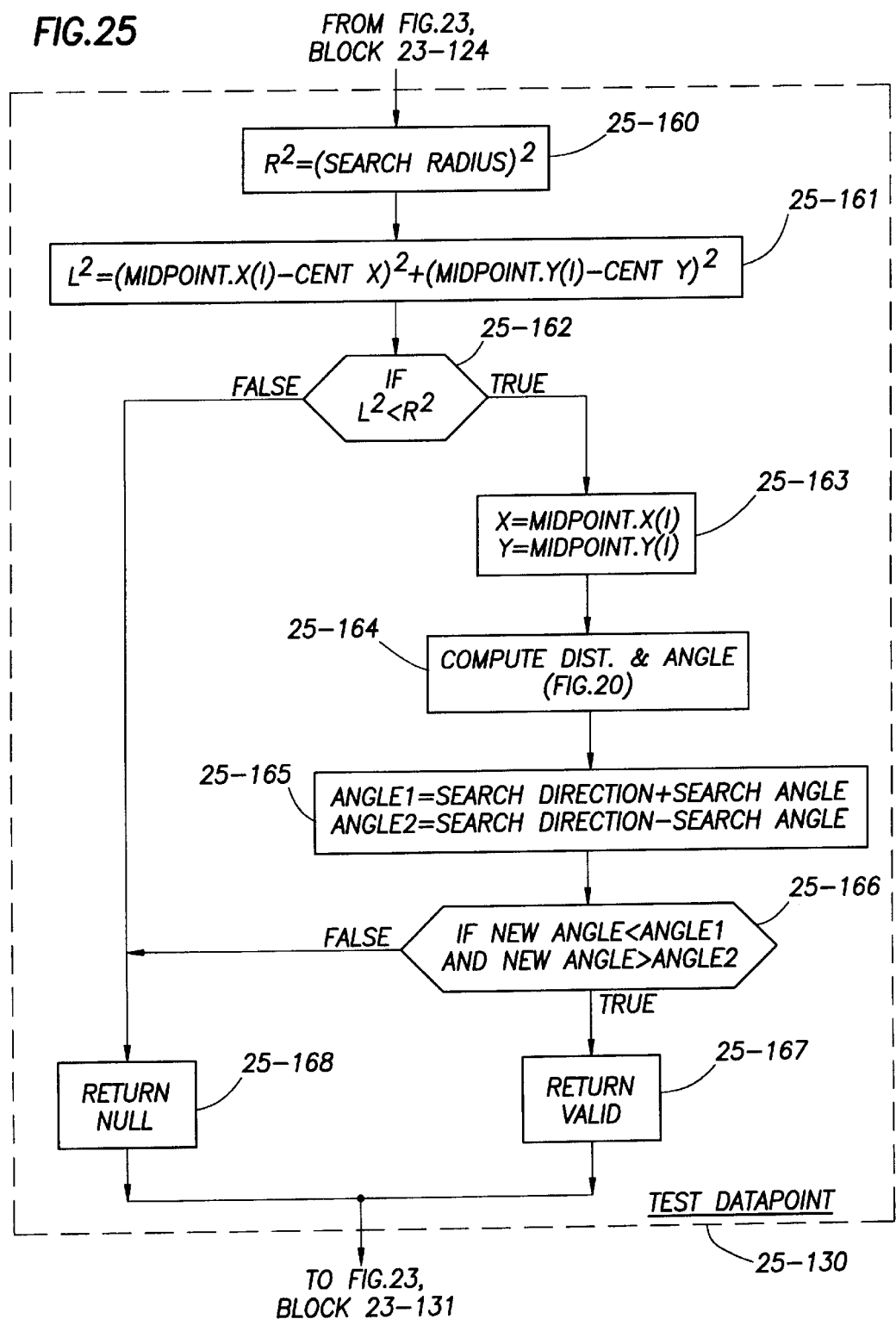
FIG. 25 is a flow chart of the Test Datapoint program within the Base Map Software in accordance with the teaching of the preferred embodiment of the invention.

FIG. 25 shows the flow chart for the Test Datapoint program 25-130 which is used by the Find Trend program in FIGS. 23 and 23A to determine which fault contact points located by the Find Closest program 24-129 fall within the search angle of widget 8-33. The search angle is shown as the angle of pie segment 8-36 of widget 8-33. As each successive point is identified by Find Closest program 24-129 it must then be tested to determine if it is within the search angle of pie segment 8-36. If it is not, it is rejected and the testing continues. For example, 839 d,e,h will be identified as being within the search radius of widget 8-33, but they are not within pie segment 8-36 and 8-36a, so they will be rejected.

At block 25-160 the program initially looks up the existing search radius of widget 8-33, which is the radius of widget circle 8-41, and squares the value ($R^2$). At block 25-161 the program utilizes the Pythagoreum Theorem, in a well-known manner, along with the X,Y coordinates of fault contact point 8-39a (at pin 8-37) to calculate the squared distance (hypotenuse squared=$L^2$) from pin 8-37 to a first input fault contact point 8-39 from a list of fault contact points.

At block 25-162, the program compares $L^2$ from block 25-161 to $R^2$ (initially the search radius) from block 25-160. If $L^2$ is less than $R^2$ this indicates that the point 8-39 being tested falls within search radius of widget 8-33 and the program branches at TRUE to block 25-163 where the X,Y coordinate values for the fault contact point 8-39 that just tested as TRUE is stored. These X,Y coordinates are then used in block 25-164, which is the Compute Distance & Angle program of FIG. 20, to determine the angular position of the fault contact point being tested relative to pin 8-37.

At block 25-165 the number of degrees that pie segment 8-36 sides 8-38 differs from the angle of needle 8-35 are calculated. This yields the low and high extremes of the search angle. At block 25-166 the previously calculated low and high extremes of the search angle are compared to the angle calculated in block 25-164 to determine if the fault contact point 8-39 being tested falls within the search angle. With reference to FIG. 8, points 8-39 d,e,h fall inside widget 8-33, but would be rejected with the angle test just described and exit block 25-166 at FALSE to block 25-168. Block 25-168 returns a NULL indication for the point tested to the Find Trend program, FIG. 23, block 23-131. However, points 8-39b&c would be accepted because they fall within the search angle and block 25-166 gives a TRUE indication to block 25-167 which returns a TRUE indication for the fault contact point being tested to the Find Trend program, FIG. 23, block 23-131.

While what has been described herein is the preferred embodiment of the invention, it should be understood that one skilled in the art can make numerous changes without departing from the spirit and scope of the invention. For instance, while the preferred embodiment described herein is used to process seismic data, in the form of spatial data from the oil exploration field, spatial data obtained from many fields may be processed to find trends in the data.

What is claimed is:

1. A graphic tool displayed on a computer display along with spatial data representing seismic events also displayed thereon as a plurality of points, and the graphic tool is used by an operator of the computer for defining parameters to be used in searching for trends in the seismic events spatial data, said graphic tool comprising:

a plurality of search parameter indicators set by the operator, and to which said computer is responsive, to be used in searching for trends in the seismic event spatial data; and a first indicator used by the operator to indicate to said computer to perform a trend search using the operator set parameters and display a trend line on said display between the ones of said plurality of points identified in the trend search.

2. The graphic tool in accordance with claim 1 wherein said plurality of indicators set by the operator to be used in searching for trends in the spatial data comprises a second indicator to which said computer is responsive to set a starting point for a trend search to be performed on said displayed spatial data.

3. The graphic tool in accordance with claim 2 wherein said plurality of indicators set by the operator to be used in searching for trends in the spatial data comprises a third indicator to indicate to said computer the direction for a trend search to be performed in said displayed spatial data starting from said starting point.

4. The graphic tool in accordance with claim 3 wherein said plurality of indicators set by the operator to be used in searching for trends in the spatial data comprises a fourth indicator to indicate to said computer the distance from said starting point in which to search for the next point in a trend search of said spatial data.

5. The graphic tool in accordance with claim 4 wherein said plurality of indicators set by the operator to be used in searching for trends in the spatial data comprises a fifth indicator to indicate to said computer the angle on either side of the direction of search in which to search for the next point in a trend search of said spatial data.

6. The graphic tool in accordance with claim 5 wherein said plurality of indicators set by the operator to be used in searching for trends in the spatial data comprises a sixth indicator to which said computer is responsive to perform a search in the opposite direction from the direction set by said third indicator.

7. The graphic tool in accordance with claim 6 wherein said plurality of indicators set by the operator to be used in searching for trends in the spatial data comprises a seventh indicator to which said computer is responsive to perform a bi-directional trend search from said starting point.

8. The graphic tool in accordance with claim 7 wherein said plurality of indicators set by the operator further comprises an eighth indicator to which said computer is responsive to remove the trend line displayed between points identified in the most recently generated trend search.

9. The graphic tool in accordance with claim 8 wherein said plurality of indicators set by the operator comprises an ninth indicator to which said computer is responsive to remove all trend lines displayed on said display between points identified during trend searches.

10. The graphic tool in accordance with claim 8 wherein said plurality of indicators set by the operator comprises an tenth indicator to which said computer is responsive to display midpoints in a trend line displayed between the ones of said plurality of points identified in the trend search.

11. The graphic tool in accordance with claim 10 further comprising an eleventh indicator to which said computer is responsive to terminate the display of said graphic tool on said computer display.

12. The graphic tool in accordance with claim 1 wherein said plurality of indicators set by the operator further comprises an eighth indicator to which said computer is responsive to remove the trend line displayed between points identified in the most recently generated trend search.

13. The graphic tool in accordance with claim 12 wherein said plurality of indicators set by the operator comprises an ninth indicator to which said computer is responsive to remove all trend lines displayed on said display between points identified during trend searches.

14. The graphic tool in accordance with claim 13 further comprising an eleventh indicator to which said computer is responsive to terminate the display of said graphic tool on said computer display.

15. Apparatus for searching for trends in recorded spatial data representing seismic events displayed on a display, said apparatus comprising:

means for storing recorded seismic event spatial data;

means for displaying said recorded seismic event spatial data and a graphical tool used by an operator of said apparatus to specify trend search parameters (widget); and means for searching the recorded seismic event spatial data responsive to said operator specified trend search parameters and causing said displaying means to display trends in said recorded seismic event spatial data.

16. The invention in accordance with claim 15 wherein said recorded spatial data is seen on displaying means as a series of dots and said apparatus displays trends in said recorded spatial data by drawing lines between ones of said dots identified as being part of a trend.

17. A method for interactively interfacing with a computer and recorded spatial data representing seismic events displayed as a plurality of points on a display that is part of said computer for specifying parameters to be used in a search of the recorded seismic event spatial data for automatically identify trends in said spatial data, said method comprising the steps of:

displaying a graphical tool on said display along with said seismic event spatial data;

indicating a number of parameters to be used in searching for trends in the seismic event spatial data displayed on said display using said graphical tool; and performing a trend search using the indicated parameters.

18. The method in accordance with claim 17 wherein said step of indicating a number of parameters comprises the step of selecting a starting point in said displayed spatial data from which to perform said trend search.

19. The method in accordance with claim 18 wherein said step of indicating a number of parameters comprises the step of indicating a direction in which said trend search is to be performed.

20. The method in accordance with claim 19 wherein said step of indicating a number of parameters comprises the step of indicating a distance within which to search for an adjacent point in a trend.

21. The method in accordance with claim 20 wherein said step of indicating a number of parameters to be used in searching for trends in the spatial data further comprises the step of indicating an angle of search, about said search direction, to be searched for the adjacent point during said trend search.

22. The method in accordance with claim 21 wherein said step of indicating a number of parameters to be used in searching for trends in the spatial data further comprises the step of performing a search in the opposite direction from the direction set by the step of indicating a direction.

23. The method in accordance with claim 22 wherein said step of indicating a number of parameters to be used in searching for trends in the spatial data further comprises the step of performing a bi-directional trend search from said starting point.

24. The method in accordance with claim 18 wherein said computer includes a mouse with mouse buttons, and a mouse cursor is displayed on said computer display, and said starting point selecting step comprises the steps of:

selecting a first point in said spatial data to be used as the starting point for a trend search by placing the mouse cursor on said first point and operating a mouse button; and re-displaying said graphical tool centered on said first point.

25. The method in accordance with claim 24 wherein said direction for a trend search is indicated by a needle displayed as part of the graphic tool and said direction indicating step comprises the steps of:

placing the mouse cursor on said needle and operating a mouse button;

moving the mouse cursor to a new direction and releasing the mouse button; and re-displaying said graphic tool with said needle pointing in the new direction.

26. The method in accordance with claim 25 wherein said graphical tool includes a displayed circle only in which said trend search is performed and said step of indicating a distance within which to search for an adjacent point in a trend comprises the steps of:

placing the mouse cursor on said circle and operating a mouse button;

moving the mouse cursor to a new position within or without said circle and releasing the mouse button; and re-displaying said graphic tool with its circle having a new radius as indicated when the mouse button was released.

27. The method in accordance with claim 26 wherein said graphical tool includes a pie shaped segment displayed within the circle of the tool, with the apex of the pie shaped segment being on said first point, and said step indicating an angle of search about said search direction comprises the steps of;

placing the mouse cursor on the side of said pie shaped segment and operating a mouse button;

moving the mouse cursor to a new position within or without said pie shaped segment and releasing the mouse button; and re-displaying said graphic tool with the pie shaped segment having a new angle as indicated when the mouse button was released.

28. The method in accordance with claim 27 wherein said step of performing a search in the opposite direction from the direction set by the step of indicating a direction comprises the steps of:

providing an indication to the computer that a trend search should be performed in a direction opposite to that previously performed; and performing a trend search in said opposite direction.

29. The method in accordance with claim 23 wherein said step of indicating a number of parameters to be used in searching for trends in the spatial data further comprises the step of removing the trend line displayed between points identified in the most recently generated trend search.

30. The method in accordance with claim 29 wherein said step of indicating a number of parameters to be used in searching for trends in the spatial data further comprises the step of removing all trend lines displayed on said display between points identified during trend searches.

31. The method in accordance with claim 30 wherein said step of indicating a number of parameters to be used in searching for trends in the spatial data further comprises the step of displaying midpoints in a trend line displayed between the ones of said plurality of points identified in a trend search.

32. The method in accordance with claim 31 wherein said step of indicating a number of parameters to be used in searching for trends in the spatial data further comprises the step of terminating the display of said graphic tool on said computer display.

33. A program storage device (CDROM, tape, diskette) adapted for storing instructions, said instructions adapted to be executed by a processor of a computer, the instructions when executed by the processor conducting a process for searching for trends in seismic data comprising the steps of:

displaying a graphical tool on said display along with seismic event spatial data;

indicating a number of parameters to be used in searching for trends in the seismic event spatial data displayed on said display using said graphical tool; and performing a trend search using the indicated parameters.

34. The invention in accordance with claim 33 further comprising the step of selecting a starting point in said displayed spatial data from which to perform said trend search.

35. The invention in accordance with claim 34 further comprising the step of indicating a direction in which said trend search is to be performed.

36. The invention in accordance with claim 35 further comprising the step of indicating a distance within which to search for an adjacent point in a trend.

37. The invention in accordance with claim 36 further comprising the step of indicating an angle of search, about said search direction, to be searched for the adjacent point during said trend search.

38. The invention in accordance with claim 37 further comprising the step of performing a search in the opposite direction from the direction set by the step of indicating a direction.

39. The invention in accordance with claim 38 further comprising the step of performing a bi-directional trend search from said starting point.

40. The invention in accordance with claim 39 further comprising the step of removing the trend line displayed between points identified in the most recently generated trend search.

41. The invention in accordance with claim 40 further comprising the step of removing all trend lines displayed on said display between points identified during trend searches.

42. The invention in accordance with claim 41 further comprising the step of displaying midpoints in a trend line displayed between the ones of said plurality of points identified in a trend search.

43. The invention in accordance with claim 42 further comprising the step of terminating the display of said graphic tool on said computer display.

* * * * *